(12) United States Patent
Newman et al.

(10) Patent No.: US 11,411,612 B2
(45) Date of Patent: Aug. 9, 2022

(54) LOCATION-BASED BEAMFORMING FOR RAPID 5G AND 6G DIRECTIONAL MESSAGING

(71) Applicants: David E. Newman, Palos Verdes, CA (US); R. Kemp Massengill, Palos Verdes, CA (US)

(72) Inventors: David E. Newman, Palos Verdes, CA (US); R. Kemp Massengill, Palos Verdes, CA (US)

(73) Assignee: ULTRALOGIC 6G, LLC, Palos Verdes Estates, CA (US)

( * ) Notice: Subject to any disclaimer, the term of this patent is extended or adjusted under 35 U.S.C. 154(b) by 0 days.

(21) Appl. No.: 17/526,172

(22) Filed: Nov. 15, 2021

(65) Prior Publication Data

US 2022/0141678 A1    May 5, 2022

Related U.S. Application Data

(60) Provisional application No. 63/114,168, filed on Nov. 16, 2020, provisional application No. 63/117,720, (Continued)

(51) Int. Cl.
*H04W 16/28* (2009.01)
*H04W 64/00* (2009.01)
(Continued)

(52) U.S. Cl.
CPC .............. *H04B 7/01* (2013.01); *G01S 5/0027* (2013.01); *G01S 5/0054* (2013.01);
(Continued)

(58) Field of Classification Search
CPC . H04W 16/28; H04W 64/003; H04W 64/006; H04W 92/18; H04W 52/08;
(Continued)

(56) References Cited

U.S. PATENT DOCUMENTS 6,167,268 A    12/2000  Souissi
6,593,880 B2   7/2003   Velazquez
(Continued)

FOREIGN PATENT DOCUMENTS

WO    2017184190    10/2017

*Primary Examiner* — Brandon J Miller
(74) *Attorney, Agent, or Firm* — Mayer & Williams PC

(57) ABSTRACT

In 5G/6G wireless networks, a user device and a base station may transmit and receive messages unidirectionally, using directional antennas, and may thereby provide sufficient reception while saving energy and time. A user device can determine its own location and the location of the base station, calculate an angle toward the base station, and thereby transmit a narrow-beam message to the base station. The message may indicate the user device's location so that the base station can direct its transmission and reception beam toward the user device. The user device and the base station can then transmit and receive messages unidirectionally for improved energy efficiency, improved reception, and reduced interference generation. In addition, a mobile user device can indicate its speed and direction of travel, so that the base station or other user devices can calculate the changing angle and direction toward the other, and may thereby redirect their transmission and reception beams toward the other, without the need for frequent location messages or beam scanning.

20 Claims, 13 Drawing Sheets

Related U.S. Application Data filed on Nov. 24, 2020, provisional application No. 63/118,156, filed on Nov. 25, 2020, provisional application No. 63/274,221, filed on Nov. 1, 2021, provisional application No. 63/276,139, filed on Nov. 5, 2021, provisional application No. 63/276,745, filed on Nov. 8, 2021, provisional application No. 63/278,578, filed on Nov. 12, 2021.

(51) Int. Cl.

| | | |
|---|---|---|
| *G01S 5/00* | (2006.01) | |
| *H04W 92/18* | (2009.01) | |
| *H04B 7/01* | (2006.01) | |
| *H04W 72/04* | (2009.01) | |
| *H04L 1/00* | (2006.01) | |
| *H04W 72/02* | (2009.01) | |
| *H04W 52/28* | (2009.01) | |
| *H04W 52/08* | (2009.01) | |
| *H04W 52/22* | (2009.01) | |
| *H04W 28/02* | (2009.01) | |

(52) U.S. Cl.
CPC .......... *H04L 1/0003* (2013.01); *H04W 16/28* (2013.01); *H04W 52/08* (2013.01); *H04W 52/225* (2013.01); *H04W 52/282* (2013.01); *H04W 52/283* (2013.01); *H04W 52/285* (2013.01); *H04W 64/00* (2013.01); *H04W 64/003* (2013.01); *H04W 64/006* (2013.01); *H04W 72/02* (2013.01); *H04W 72/048* (2013.01); *H04W 72/0453* (2013.01); *H04W 72/0473* (2013.01); *H04W 28/0268* (2013.01); *H04W 52/228* (2013.01); *H04W 92/18* (2013.01)

(58) Field of Classification Search
CPC .......... H04W 52/225; H04W 52/283; H04W 52/285; H04W 64/00; H04W 72/02; H04W 72/0453; H04W 72/0473; H04W 72/048; H04W 28/0268; H04W 52/228; H04W 52/146; G01S 5/0027; G01S 5/0054; H04B 7/01

See application file for complete search history.

(56) References Cited

U.S. PATENT DOCUMENTS

| | | | |
|---|---|---|---|
| 8,254,281 B2 | 8/2012 | Hadad | |
| 2002/0147032 A1* | 10/2002 | Yoon | H04B 7/0617 455/562.1 |
| 2003/0125046 A1* | 7/2003 | Riley | G01S 5/0242 455/12.1 |
| 2010/0124212 A1 | 5/2010 | Lo | |
| 2011/0238286 A1 | 9/2011 | Roesser | |
| 2013/0287080 A1 | 10/2013 | Li | |
| 2014/0302872 A1 | 10/2014 | Lane | |
| 2017/0208600 A1 | 7/2017 | Hsu | |
| 2018/0083730 A1 | 3/2018 | Gulati | |
| 2018/0138963 A1 | 5/2018 | Hernando | |
| 2018/0206075 A1 | 7/2018 | Demirdag | |
| 2018/0279246 A1 | 9/2018 | Gan | |
| 2019/0222302 A1 | 7/2019 | Lin | |
| 2019/0281561 A1 | 9/2019 | Sawai | |
| 2019/0342841 A1 | 11/2019 | Wu | |
| 2019/0364390 A1* | 11/2019 | Kurras | H04W 4/029 |
| 2020/0186236 A1 | 6/2020 | Wang | |
| 2020/0296710 A1 | 9/2020 | Logothetis | |
| 2020/0367067 A1 | 11/2020 | Haley | |
| 2021/0029653 A1 | 1/2021 | Zhang | |
| 2021/0136700 A1 | 5/2021 | Arad | |
| 2021/0273714 A1 | 9/2021 | Lee | |
| 2021/0385755 A1 | 12/2021 | Zavesky | |
| 2022/0018925 A1* | 1/2022 | Duan | G01S 3/023 |

\* cited by examiner

LOCATION-BASED BEAMFORMING FOR RAPID 5G AND 6G DIRECTIONAL MESSAGING

PRIORITY CLAIMS AND RELATED APPLICATIONS

This application claims the benefit of U.S. Provisional Patent Application Ser. No. 63/114,168, entitled "High-Power Transmission of Priority Wireless Messages", filed Nov. 16, 2020, and U.S. Provisional Patent Application Ser. No. 63/117,720, entitled "Automatic Frequency Correction for Wireless Mobile Communications", filed Nov. 24, 2020, and U.S. Provisional Patent Application Ser. No. 63/118,156, entitled "Automatic Frequency Correction for Wireless Mobile Communications", filed Nov. 25, 2020, and U.S. Provisional Patent Application Ser. No. 63/274,221, entitled "Rapid Doppler Correction for Mobile V2X Communication in 5G/6G", filed Nov. 1, 2021, and U.S. Provisional Patent Application Ser. No. 63/276,139, entitled "Location-Based Power for High Reliability and Low Latency in 5G/6G", filed Nov. 5, 2021, and U.S. Provisional Patent Application Ser. No. 63/276,745, entitled "AI-Based Power Allocation for Efficient 5G/6G Communications", filed Nov. 8, 2021, and U.S. Provisional Patent Application Ser. No. 63/278,578, entitled "Location-Based Beamforming for Rapid 5G and 6G Directional Messaging", filed Nov. 12, 2021, all of which are hereby incorporated by reference in their entireties.

FIELD OF THE INVENTION

Disclosed are systems and methods for a wireless entity to direct a transmission or reception beam toward a second entity, based on relative locations.

BACKGROUND OF THE INVENTION 5G and 6G provide for base stations and user devices to reduce energy consumption and interference using an electronically articulated antenna configured to have a maximum gain in a particular direction for transmission as well as reception. However, aligning the transmission or reception beam between two entities generally requires extensive scanning and feedback messaging between both entitles, a significant consumption of time and energy. What is needed is means for base stations and user devices to align their transmission and reception beams in less time with fewer feedback messages.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY OF THE INVENTION

In a first aspect, there is non-transitory computer-readable media in a base station of a wireless network comprising instructions that, when implemented, cause the base station to perform a method comprising: determining a first location corresponding to the base station or to an antenna of the base station; receiving a first message, from a mobile user device, specifying a second location corresponding to the mobile user device; calculating, based at least in part on the first and second locations, a direction toward the mobile user device from the base station; preparing a downlink transmission beam aimed according to the direction; and transmitting, to the mobile user device, a second message according to the downlink transmission beam.

In another aspect, there is a method for a mobile user device to transmit a message to a base station, comprising: determining, by the mobile user device, a location of the base station; determining, by the mobile user device, a location of the mobile user device; calculating, by the mobile user device, based at least in part on the location of the base station and the location of the mobile user device, an angle or direction toward the base station from the mobile user device; preparing, by the mobile user device, an uplink transmission beam aimed according to the angle or direction; and transmitting, by the mobile user device, according to the uplink transmission beam, the message.

In another aspect, there is a first mobile user device configured to: determine a first location of the first mobile user device; transmit a first message specifying the first location; receive a second message, transmitted by a second mobile user device, specifying a second location of the second mobile user device; calculate a direction from the first location toward the second location; prepare a sidelink transmission beam according to the direction; and then transmit a message to the second mobile user device according to the sidelink transmission beam.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

These and other embodiments are described in further detail with reference to the figures and accompanying detailed description as provided below.

BRIEF DESCRIPTION OF THE DRAWINGS

Like reference numerals refer to like elements throughout.

DETAILED DESCRIPTION

Figure 1A:
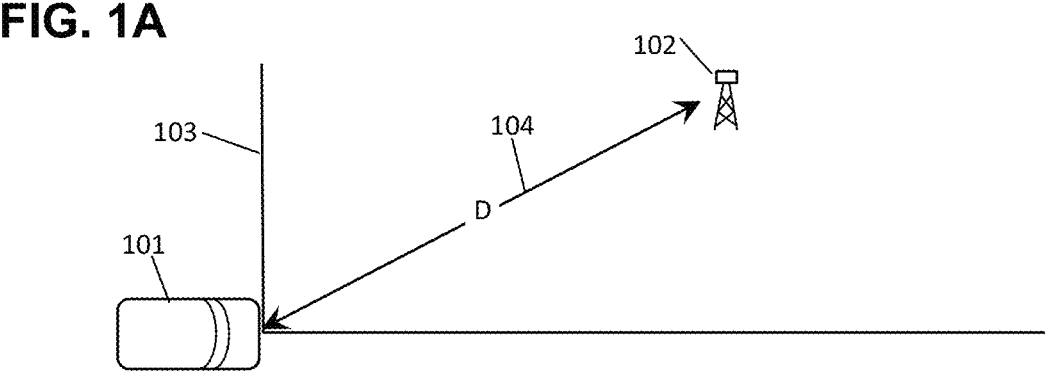
FIG. 1A is a schematic showing an exemplary embodiment of a mobile user device communicating with a base station, according to some embodiments.

Disclosed herein are systems and methods for a user device or a base station of a wireless 5G/6G network to obtain enhanced message reliability by causing a transmitter to direct its emissions toward a recipient, and by causing a receiver to direct a maximum sensitivity toward a transmitting entity, based on the locations of the two entities. Systems and methods disclosed herein (the "systems" and "methods", also occasionally termed "embodiments" or "arrangements" or "versions", generally according to present principles) can provide urgently needed wireless communication protocols to adjust transmitter and receiver directionality, thereby saving energy, preventing message faults, enhancing message reliability, and providing low latency when required.

Most wireless communications are not transmitted at the maximum power available. Transmissions with power in excess of that required for reception would waste energy (a consideration particularly for battery-operated devices), generate heat, and potentially interfere with other users such as those in adjoining networks. When the density of users is high, the potential for noise and interference from other transmitters becomes increasingly problematic. Therefore, the base station usually directs each user to restrict its transmission amplitude based on the reception SNR or SINR (signal to interference and noise) received by the base station, and that amplitude is generally lower than the maximum power that the user's transmitter could achieve. Likewise the users may send signal-quality reports back to the base station regarding the downlink signal quality received by the users, and those reports may enable the base station to adjust its own transmission power to be just sufficient for reception by each user. By this feedback, the base station transmitter power is usually set well below its full transmitter capability, which thereby avoids wasting power and interfering with other networks. However, in some cases, a user may need enhanced communication reliability or reduced latency, especially when reception deteriorates due to long range or an obstruction, for example. In those cases it may be advantageous to enhance communication reliability and avoid retransmission delays by automatically increasing the transmission power above the level normally allowed or normally employed, without the need for a power scan with feedback messages and the like. If the condition necessitating the power increase then subsides, the transmission power can be automatically returned to normal, according to some embodiments.

Terms herein generally follow 3GPP (third generation partnership project) standards, but with clarification where needed to resolve ambiguities. As used herein, "5G" represents fifth-generation and "6G" sixth-generation wireless technology. A network (or cell or LAN or local area network or the like) may include a base station (or gNB or generation-node-B or eNB or evolution-node-B or access point) in signal communication with a plurality of user devices (or UE or user equipment or nodes or terminals) and operationally connected to a core network (CN) which handles non-radio tasks, such as administration, and is usually connected to a larger network such as the Internet. Embodiments may include direct user-to-user ("sidelink") communication such as V2V (vehicle-to-vehicle) communication, V2X (vehicle-to-anything), X2X (anything-to-anything, also called D2D or device-to-device) and base station communications or V2N (vehicle-to-network). Here, "vehicle" is to be construed broadly, including any mobile wireless communication device. The time-frequency space is generally configured as a "resource grid" including a number of "resource elements", each resource element being a specific unit of time termed a "symbol time", and a specific frequency and bandwidth termed a "subcarrier" (or "subchannel" in some references). Each subcarrier can be independently modulated to convey message information. Thus a resource element, spanning a single symbol in time and a single subcarrier in frequency, is the smallest unit of a message. Each modulated resource element of a message is referred to as a "symbol" in references, but this may be confused with the same term for a time interval. Therefore, each modulated reference element of a message is referred to as a "message element" in examples below. A "demodulation reference" is a set of modulated resource elements that exhibit levels of a modulation scheme (as opposed to conveying data), and each resource element of a demodulation reference is termed a "reference element" herein. A message may be configured "time-spanning" by occupying sequential symbols at a single frequency, or "frequency-spanning" on multiple subcarriers at a single symbol time (also called "frequency-first" if the message continues on multiple symbol times). "CRC" (cyclic redundancy code) is an error-checking code. "RNTI" (radio network temporary identity) or "C-RNTI" (cell radio network temporary identification) is a network-assigned user code. "QoS" is quality of service, or priority. "QCI" (QoS class identifier) defines various performance levels. A message is "unicast" if it is addressed to a specific recipient, and "broadcast" if it includes no recipient address. Transmissions are "isotropic" if they provide roughly the same wave energy in all horizontal directions. A device "knows" something if it has the relevant information. A device "listens" or "monitors" a channel or frequency if the device receives, or attempts to receive, signals on the channel or frequency. A message is "faulted" or "corrupted" if one or more bits of the message are altered relative to the original message. "Receptivity" is the quality of reception of a message. "QPSK" (quad phase-shift keying) is a modulation scheme with two bits per message element, and 16QAM (quadrature amplitude modulation with 16 states) is a modulation scheme with 4 bits per message element. In beamforming, a "transmission beam" is a direction of maximum transmitted radio power, and a "reception beam" is a direction of maximum received sensitivity, generally using an antenna that can be operated as a phased array with either analog or digital electronic antenna interface circuits. "Omnidirectional" refers to receiving or transmitting uniformly in all horizontal directions, or other wide angular range, not specifically directed at a particular angle. "Unidirectional" refers to transmitting or receiving with a maximum power or receptivity at a particular direction. A "synchronization signal block" (SSB) and a "first system information block" (SIB1) are system information messages that a network transmits to new user devices.

Embodiments of the systems and methods include a user device configured to determine the distance to a base station and to adjust its uplink transmission power level so that the amplitude as-received by the base station is in a prescribed range. Further embodiments include a base station configured to determine the distance to the user device and adjust its downlink transmission power level for sufficient reception by the user device. Also disclosed are charts or maps or the like, indicating regions of obstruction or poor receptivity. Alternatively, the maps or the like may indicate transmission power levels versus location, including enhanced power levels to account for obstructions or regions of reduced receptivity, for example. A user device and/or a base station can maintain such maps or the like in non-transitory computer-readable memory, and can thereby adjust its transmission power level to provide sufficient reception. The systems and methods further include direct user-to-user messaging, with power compensation depending on the locations of the transmitting and receiving entities. Further embodiments include mobile user devices and/or base stations configured to calculate an updated distance between two entities based on a previously determined location and speed and direction of travel of the two entities, then calculate an updated power level based at least in part on the updated distance, and to transmit a message according to the updated transmission power level.

Further embodiments include a base station configured to aim transmission power toward a particular user device and to aim the base station's antenna's maximum sensitivity direction toward the user device. Embodiments include a user device configured to aim transmission power toward a base station and to aim the user device's antenna's maximum sensitivity direction toward the base station. Other embodiments include two user devices communicating in sidelink and directing their transmission energy and reception sensitivity toward each other. In each case, the directionality may be based on the relative locations of the two communicating entities.

A motivation for the systems and methods disclosed herein may include improving signal reception at longer range and among obstructions automatically, while avoiding time-consuming power scans and feedback messaging. A further motivation may be to enhance reliability by reducing message faults by providing sufficient as-received amplitude despite changing conditions. A further motivation may be to provide low latency by avoiding delays associated with non-acknowledgements and message retransmissions.

Following are examples of a mobile user device adjusting its uplink transmission power for satisfactory receptivity, based on the distance between the user device and the base station.

FIG. 1A is a schematic showing an exemplary embodiment of a mobile user device communicating with a base station, according to some embodiments. As depicted in this non-limiting example, a user device 101, depicted as a vehicle in top view, is in communication with a base station 102, depicted as an antenna. Locations of the user device 101 and the base station 102 are relative to a reference frame 103, such as the geographic latitude and longitude, or other suitable frame. The distance D 104 between the user device 101 and the base station 102 is indicated. To determine the distance 104, the user device 101 can determine its own location using, for example, a satellite-based navigation system such as GPS, or a map, a local address, or other suitable geographical locating system. The user device 101 can also determine the location of the base station 102 using a published database of network information, or a map, or a previous registration on that base station, or a message from the base station 102, or from another base station having the relevant data, or other suitable means for locating the base station. The user device 101 can then calculate the distance 104 according to a suitable formula, such as the square-root of: the square of the difference in latitude values, plus the square of the difference in longitude values.

The user device 101 can then determine a transmission power level according to the distance 104. For example, the user device 101 may include (in non-transitory computer-readable memory) an algorithm, formula, computer code, tabulation, or other way of relating the transmission power level to the distance 104. For example, the algorithm may select a lower power level for shorter distances to avoid overdriving the base station receiver, and higher power levels for longer distances to enable the base station to receive a message reliably. Using that selected power level, the user device 101 may then transmit an uplink message to the base station 102 indicating, among other data, the location of the user device 101, or the distance calculated, or both. The base station 102 may then repeat the distance calculation and/or employ its own algorithm to determine a sufficient power level for downlink communications with the user device 101 across that distance 104. The base station 102 may then transmit an acknowledgement to the user device 101 using that sufficient power level. In some embodiments, the uplink message and/or the acknowledgement may be transmitted according to 5G or 6G technology.

An advantage of determining the distance 104 and the selected power level before transmitting the message, may be that the message may arrive at the destination with sufficient amplitude to be reliably received, but not so much amplitude that it would overdrive the receiver or interfere with other user devices elsewhere. Another advantage may be that a time-consuming "power scan" may be avoided. (A power scan is a time-consuming iterative procedure by which the user device repeatedly transmits short messages at various power levels and the base station indicates which messages are detected and, optionally, the amplitude level received. A second power scan may then be carried out with the base station varying the downlink power and the user device indicating receptivity.) Another advantage may be that the message may be received with high reliability and low latency, by avoiding message faults due to insufficient power. A further advantage may be that the user device may avoid the delays and energy wastage involved in receiving a non-acknowledgement (or no acknowledgement within a predetermined interval) and then retransmitting the message at a higher power level.

Another advantage may be that the depicted procedures may be compatible with devices that may have difficulty complying with prior-art 5G or 6G registration procedures. Another advantage may be that the depicted procedures may be implemented as a software (or firmware) update, without requiring new hardware development, and therefore may be implemented at low cost, according to some embodiments. The procedures may be implemented as a system or apparatus, a method, or instructions in non-transitory computer-readable media for causing a computing environment, such as a user device, a base station, or other signally-coupled component of a wireless network, to implement the procedure. As mentioned, the examples are non-limiting. Other advantages may be apparent to skilled artisans after reading this disclosure. The advantages in this paragraph may apply equally to other embodiments described below.

Figure 1B:
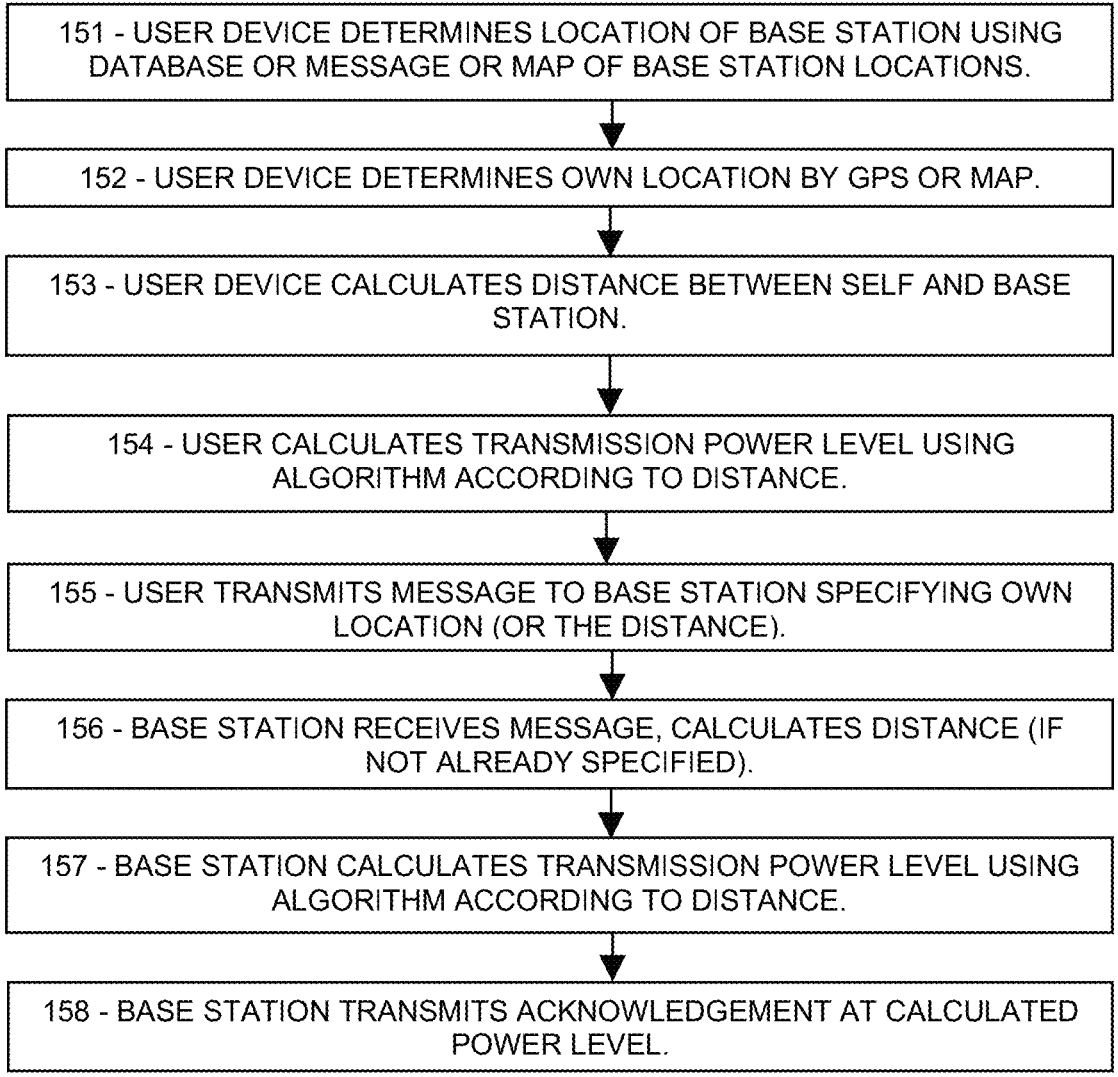
FIG. 1B is a flowchart showing an exemplary embodiment of a procedure for a mobile user device and a base station to adjust their transmission power levels, according to some embodiments.

FIG. 1B is a flowchart showing an exemplary embodiment of a procedure for a mobile user device and a base station to adjust their transmission power levels, according to some embodiments. As depicted in this non-limiting example, at 151 a mobile user device, such as a vehicle, determines the location of a base station, such as a base station proximate to the user device. The user device may determine the base station's location using a publicly accessible tabulation of base station locations, or a message from that base station or another base station or another transmitter, or a map of base station locations, or other way of finding the base station's location. Then, if not sooner, the user device determines, at 152, its own location using, for example, GPS or other means. At 153 the user device calculates the distance between itself and the base station according to the locations determined.

At 154, the user device calculates a transmission power level to use in communicating with the base station. That calculation may employ an algorithm or formula or function or computer code or graphical correlation or interpolatable tabulation or other means for determining a suitable and sufficient power based at least in part on the distance. At 155, the user device transmits an uplink message using the calculated power level. The transmission power level may be adjusted by adjusting an amplifier in the transmitter, or digitally by calculating a transmission waveform with a particular amplitude, or other means well known in the radio arts. In some embodiments, the uplink message may include an indication of the user device's location, or of the calculated distance, or other data enabling the base station to adjust its power level corresponding to the distance.

At 156, the base station receives the uplink message and adjusts its downlink transmission power level according to the distance. The base station may also check the user device's analysis by recalculating the distance, depending on which items of information are included in the uplink message. At 157, the base station may use an algorithm, or the like, to calculate a sufficient transmission power level based at least in part on the distance. The base station's power level may differ from that of the user device because their antennas may be quite different, among many other differences between the base station and the user device. Then, at 158, the base station may transmit an acknowledgement, or other message, to the user device, using the downlink power level thus determined.

The user device and the base station may thereby communicate with sufficient reliability upon their first exchanged messages, without performing power scans, and with little chance of message failure, according to some embodiments.

The systems and methods further include procedures for base stations to compensate for obscurations that may interfere with communications, based on the mobile user device location, as described in the following examples.

Figure 2A:
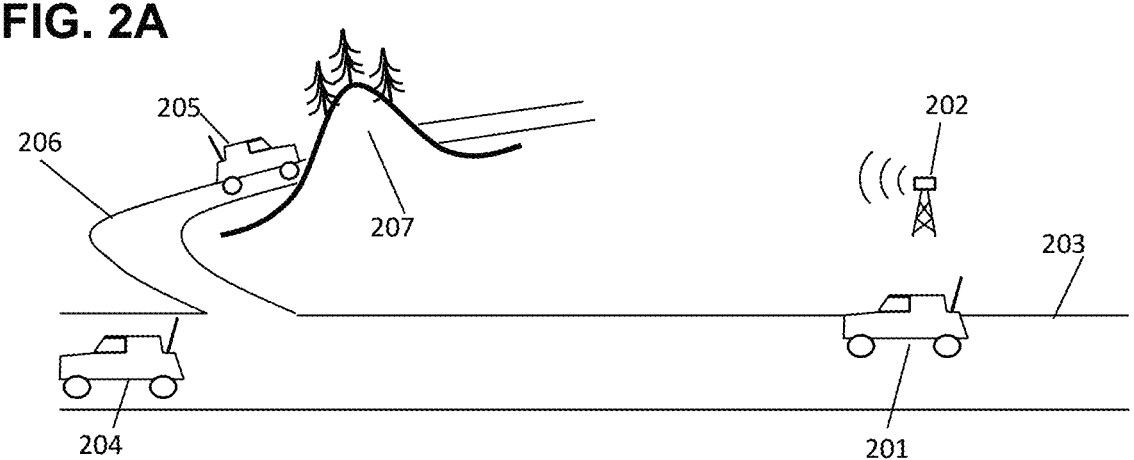
FIG. 2A is a sketch showing an exemplary embodiment of a mobile user device passing by an obscuration, according to some embodiments.

FIG. 2A is a sketch showing an exemplary embodiment of a mobile user device passing by an obscuration, according to some embodiments. As depicted in this non-limiting example, a first mobile user device 201, depicted as a vehicle, communicates with a base station 202, depicted as an antenna, while traveling on a main road 203. A second mobile user device 204 is on the same road 203 but farther ahead. The figure shows the first user device 201 quite close to the base station 202, while the second user device 204 is much farther from the base station 202. The user devices 201 and 204 may be configured to determine their distance from the base station 202, by comparing their own location to the base station's location, and may adjust their uplink transmission power levels accordingly to provide a particular signal amplitude as-received by the base station. The user devices 201 and 204 may also communicate their calculated distances to the base station 202, so that the base station 202 can adjust its downlink transmission power higher for the shorter distance of user device 201, and higher power for the longer distance of user device 204, and thereby provide sufficient amplitude as-received for reliable reception by each of the user devices 201 and 204.

In some embodiments, the first user device 201 may include, in its message to the base station 202, an indication of its speed and direction of travel, in addition to its current location. Using that information, the base station 202 may be configured to calculate the distance to that user device 201 as a function of time. The base station 202 can then adjust its downlink transmission power level according to the time-dependent distances, and thereby deliver sufficient receptivity while avoiding the need for frequent position-updating message exchanges from the user devices 201 and 204. In the position calculation, the base station 202 may assume that the velocity of the user device 201 remains constant at the stated value, and that the user device (if a vehicle) follows the curves of whatever road it is on, unless informed otherwise. The base station 202 may thereby calculate the distance as a function of time, and adjust its power level accordingly, without the need for frequent position-updating messages from the user devices 201 and 204.

The figure also shows a third user device 205 on a side road 206 that passes behind an obscuration depicted as a hill 207, which attenuates the signal. The base station 202 may calculate the location of the third user device 205 based on its speed and direction, as well as the way the side road 206 curves. The base station 202 may thereby determine that the user device 205 is about to pass behind the hill 207, and therefore may increase the transmission power of any messages to that user device 205. In addition, the base station 202 may calculate, based on the speed of the third user device 205, when it is expected to emerge from the obstruction 207, and may revert to the normal power level thereafter. In addition, the base station 202 may have previously determined (by experimentation, for example) how much to increase the transmit power, so that the third user device 205 may receive messages reliably while obscured.

Figure 2B:
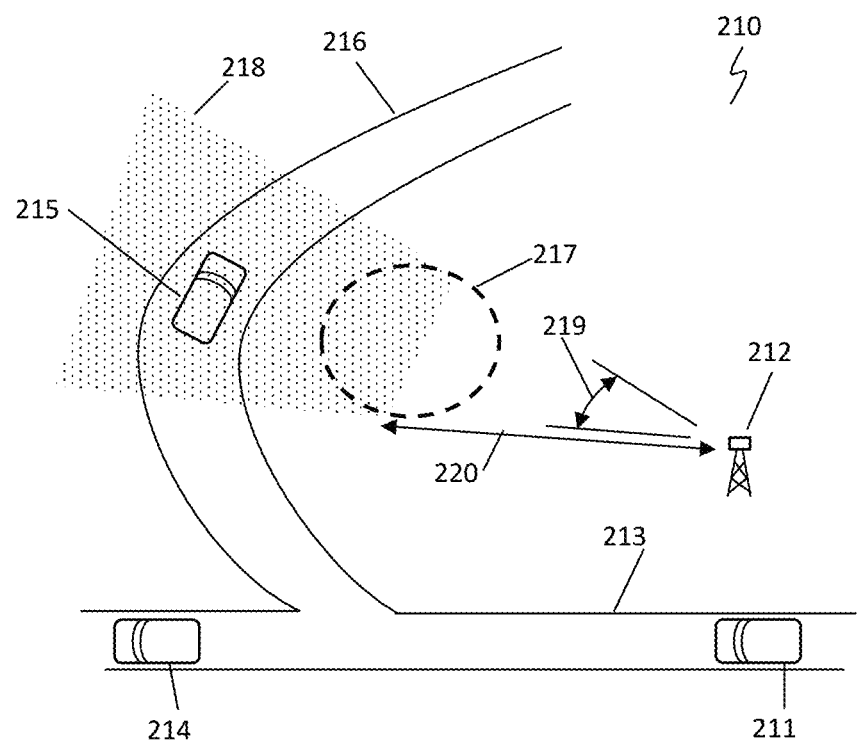
FIG. 2B is a schematic showing an exemplary embodiment of a base station compensating for signal attenuation, according to some embodiments.

FIG. 2B is a schematic showing an exemplary embodiment of a base station compensating for signal attenuation, according to some embodiments. As depicted in this non-limiting example, a map 210 of the scenario of FIG. 2A includes the first, second, and third user devices 211, 214, 215 on a main road 213 and a side road 216, plus a base station 212 and a hill 217 (in dash). Also shown is a region of reduced receptivity 218 (stipple) in which messages transmitted from the base station 212 are attenuated by the obscuration 217. The region of reduced receptivity 218 is determined, in this case, by the size of the hill 217, which subtends an angle 219 as viewed by the base station 212, at a distance 220 from the base station 212. Hence, as discussed, the base station 212, after receiving a message from the third user device 215 indicating its location and speed and direction, can determine that the third user device is on the section of the side road 216 that curves behind the obstruction 217. In addition, the base station 212 can calculate the times that the third user device 215 is expected to enter and exit the region of reduced receptivity 218. Accordingly, the base station 212 may increase its transmission power to an enhanced power level greater than the normal power level for that distance, and may transmit messages to the third user device 215 according to the enhanced power level while it is obscured, and may thereby compensate the attenuation, while the third user device 215 remains obscured. As mentioned, the base station 212 may have previously determined, from experiments for example, an attenuation level or an enhanced transmission power level, and thus to determine by how much to increase the power to keep the received message amplitudes roughly the same for mobile user devices inside and outside the region of reduced receptivity 218.

Mobile wireless users are generally quite familiar with the "dead zones" along the routes they routinely travel, where receptivity is poor. The base stations serving the area can generate an area map, such as that depicted but extending throughout a region. The area map may include contour levels or the like, indicating the degree of signal attenuation at each region, as viewed by each base station. Alternatively, the map may indicate what level of power is needed for adequate reception at each point in the area as viewed by the base station. Each base station can then adjust its power accordingly so that messages to user devices passing through each obscuration zone are properly received. Each base station's receptivity map may also indicate regions where the reception from that base station is so poor that the user device may be better served by another base station. In that case, the initial base station can arrange a hand-off to the other base station as the user device is approaching the obscuration, so that the user device can have uninterrupted service.

Figure 2C:
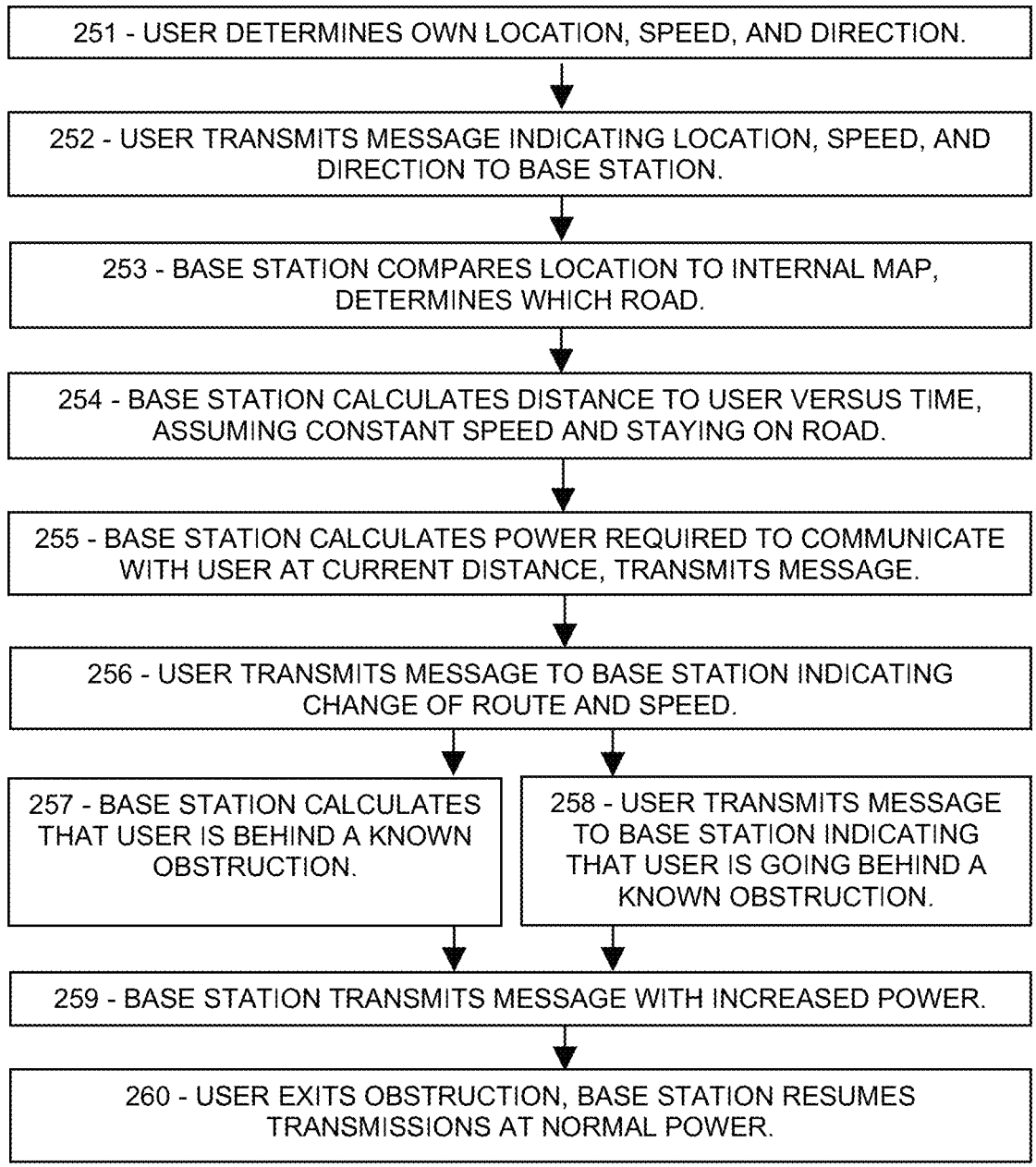
FIG. 2C is a flowchart showing an exemplary embodiment of a procedure for a mobile user device and a base station to compensate for signal obscuration, according to some embodiments.

FIG. 2C is a flowchart showing an exemplary embodiment of a procedure for a mobile user device and a base station to compensate for signal obscuration, according to some embodiments. As depicted in this non-limiting example, at 251, a mobile user device determines its own location, speed, and direction of travel using, for example, satellite navigation, a speedometer, and an electronic compass. At 252, the user device transmits a message with this information to a base station. At 253, the base station compares the location with a map (or database of road locations, contained in non-transitory computer-readable memory) to determine which road the user device is on. The base station may also check that the direction and speed are consistent with the road, and other consistency tests. At 254, the base station calculates a formula for the distance to the user device versus time, based on the speed. The base station may also take into account current traffic conditions, known changes in the road such as curves, and other factors that may influence the position extrapolation. Then at 255, the base station may have a message to send to the user device, and may calculate the distance from the base station to the user device at that moment using the formula, or according to the road map, or otherwise. Optionally, the base station may also monitor the amount of background noise or interference that may degrade the reception of the message. The base station may then determine how much transmitter power is required to transmit the message so that the user device will likely receive it without fault, based at least in part on the distance and/or the current background level, and then may transmit the message.

At 256, the user device has changed direction or speed, and therefore may transmit an uplink message to the base station informing it of the change. Using that updated information, at 257, the base station may calculate that the user device is about to pass behind a known obscuration. Alternatively, at 258, the user device may transmit a message indicating that it is about to pass behind an obscuration or is about to enter a known "dead zone" based, for example, on past experience. In either case, at 259, the base station may transmit a downlink message to the user device using increased transmitter power, to overcome the attenuation caused by the obscuration. At 260, the base station may determine that the user device has likely exited from the obscuration zone according to its stated speed, and therefore the base station may resume transmissions to the user device with the normal power level.

In this way a base station, or a core network attached to multiple access points, may keep track of the positions and receptivity of the various mobile user devices that they serve, and may increase or decrease transmission power to compensate for obstructions, and may thereby provide communications with relatively constant reliability as the user devices move around.

The systems and methods further include procedures for user devices to communicate directly with each other, not involving a base station. The user devices in such a sidelink communication may adjust their transmission power to provide sufficient reception to other user devices based on location, as described in the following examples.

Figure 3A:
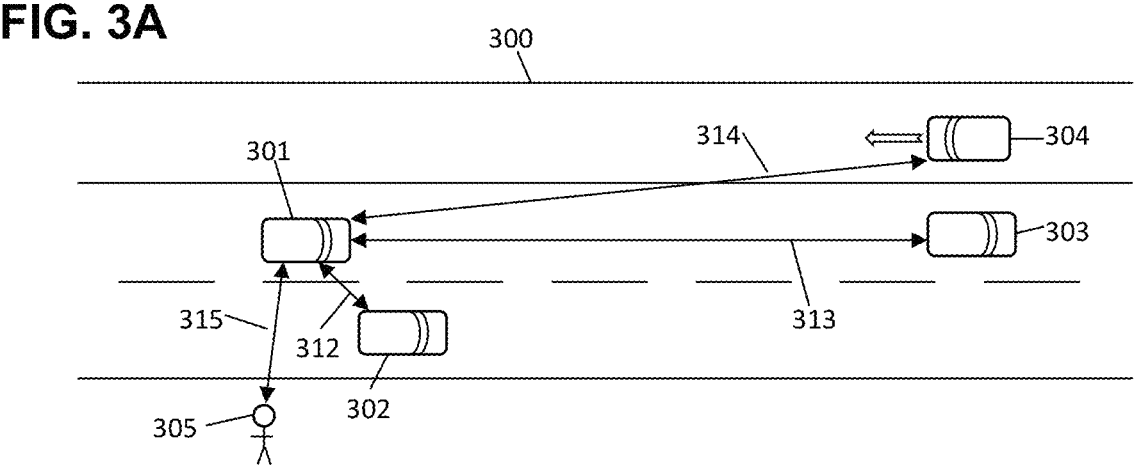
FIG. 3A is a schematic showing an exemplary embodiment of vehicles communicating with power compensation, according to some embodiments.

FIG. 3A is a schematic showing an exemplary embodiment of vehicles communicating with power compensation, according to some embodiments. As depicted in this non-limiting example, a first vehicle 301 is in communication with a second, third, and fourth vehicle 302, 303, 304 on a highway 300, as well as a pedestrian 305. The figure shows the distances 312, 313, 314 from the first vehicle 301 to the second, third, and fourth vehicles 302, 303, 304 respectively, and the distance 315 to the pedestrian 305.

Since the various entities are at different distances, the first vehicle 301 may transmit individual messages to them, each with a different power level, so that each receiving entity can receive each message with sufficient amplitude for reliable reception, but without wasting energy on excessively powerful transmissions. For example, the first vehicle 301 may broadcast a message indicating its location and optionally its speed and direction. The other entities 302-305 may receive that message and may reply by transmitting or broadcasting a responsive message specifying their own locations, and optionally their speeds and directions. (Such messages may assist the other vehicles in avoiding collisions, for example.) Thus each of the entities 301-305 can calculate the distance from itself to each other entity in the figure, and can determine a transmission power level according to the calculated distance, to provide sufficient message receptivity. In addition, if the speed and direction information are provided in the messages, each of the entities 301-305 can calculate future locations and future distances, and thereby can adjust the transmission power level for sufficient reception of future messages. For example, the first and third vehicles 301, 303 are on the same side of the highway 300 and therefore are likely traveling in the same direction and approximately the same speed, whereas the fourth vehicle 304 is traveling in the opposite direction as indicated by an arrow. The first vehicle 301 may determine that the distance between itself and the third vehicle 303 is likely constant or slowly varying, whereas the distance to the fourth vehicle 304 is likely changing very rapidly due to their opposite directions. In addition, the first vehicle 301 may determine that the distance 315 between itself and the pedestrian 305 may be changing slowly at first, since the location of the pedestrian 305 is nearly perpendicular to the direction of travel of the first vehicle 301, but that the distance will likely increase geometrically as the first vehicle 301 proceeds down the highway 300.

Figure 3B:
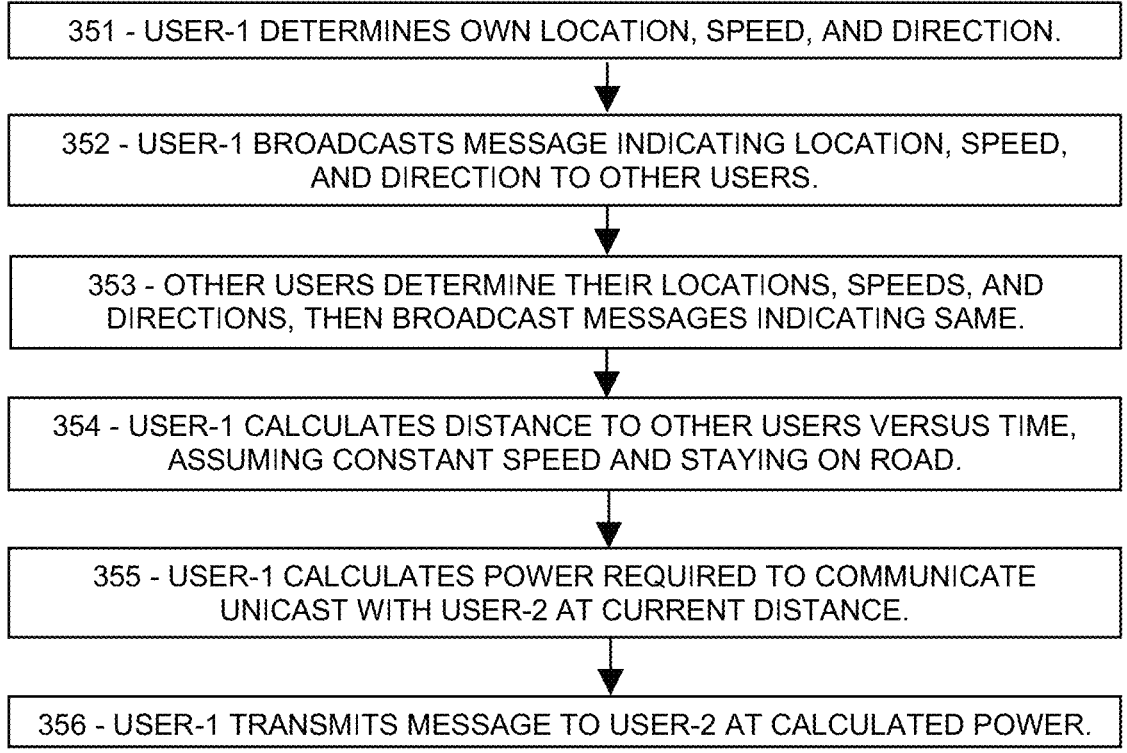
FIG. 3B is a flowchart showing an exemplary embodiment of a procedure for mobile user devices to compensate for distance, according to some embodiments.

FIG. 3B is a flowchart showing an exemplary embodiment of a procedure for a mobile user device to compensate for distance, according to some embodiments. As depicted in this non-limiting example, a mobile user device User-1 communicates with a User-2 to adjust transmission power according to the distance between them. At 351, User-1 determines its own location, speed, and direction of motion, and at 352 broadcasts a message indicating those values to other user devices in range. At 353, the other user devices determine their locations, speeds, and directions, then broadcast messages indicating those values. All of the user devices receive each other's messages and determine from them the locations, speeds, and directions of the various devices.

At 354, User-1 calculates the distance to each of the other user devices according to their locations, and also determines formulas indicating the location of each user device versus time according to its speed and direction. For example, User-1 can determine a first time elapsed since User-1 determined its own location, and a second time elapsed since receiving the location message from a User-2. User-1 can assume that the speed remains constant unless informed of a change in speed. User-1 can then calculate the expected location of itself and of User-2 at the current time according to the elapsed times, speeds, and directions of the two entities, respectively. If User-1 has access to a map, such as an electronic roadmap for example, then User-1 can determine which road each user device is currently on based on the stated location, and can assume that each user device will remain on the same road until informed of a change, and therefore can project or calculate the position of each user device along each of the roads versus time including curves. It may not be necessary to assume that the direction of a user device remains constant because the road may curve; instead, the rate of travel along the road may be assumed to be constant.

At 355, User-1 has a message for User-2, and therefore User-1 calculates the expected location of User-2 at that time, based on User-2's stated initial location, speed, and direction, and based on the amount of time passed since User-2 transmitted its location message. User-1 may also determine its own position, which may have changed since User-1 transmitted its location message. Using that updated information, User-1 then calculates the current distance to User-2, and adjusts its transmission power accordingly. For example, User-1 may have a formula or algorithm or the like to determine a suitable transmission power level to use for satisfactory reception at the calculated distance. Then, at 356, User-1 transmits the message to User-2 with the power set according to the level so determined.

The systems and methods further include message formats for user devices to indicate their locations, and other information, to a base station and/or to other user devices, as disclosed in the following examples.

Figure 4A:
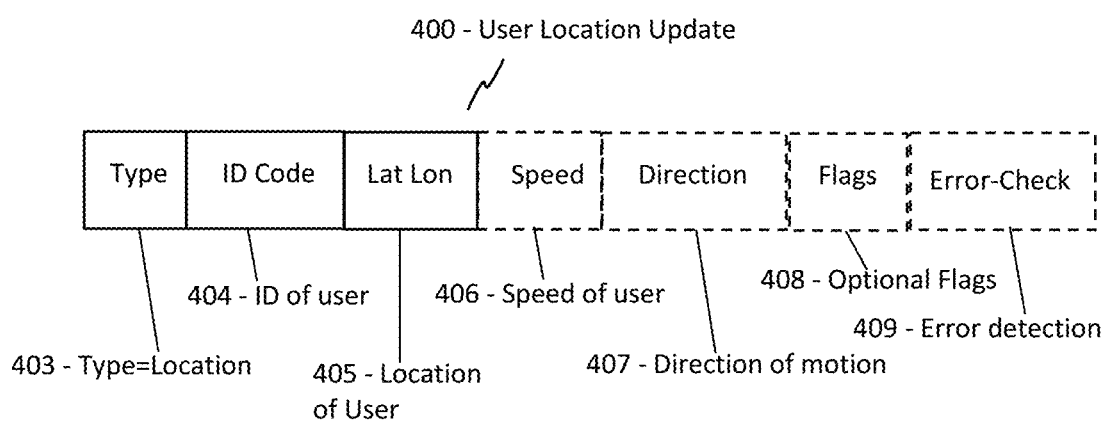
FIG. 4A is a schematic showing an exemplary embodiment of a message format for user devices to indicate locations to base stations, according to some embodiments.

FIG. 4A is a schematic showing an exemplary embodiment of a message format for user devices to indicate locations to base stations, according to some embodiments. As depicted in this non-limiting example, a user location update message 400, for a mobile user device to indicate its location to a base station, may include a message-type field 403, an identification code 404, a location field 405, an optional speed field 406, an optional direction field 407, an optional set of flags 408, and an optional error-check field 409. The message-type field 403 may include a code indicating that the message 400 is a location message including speed and direction. The identification field 404 may include a code such as the C-RNTI code or MAC address or other identifying code of the user device. The location field 405 may include the latitude and longitude of the user device, or a code related to the geographical coordinates. For example, it may not be necessary, in a local application, to include the full-degree portions of the latitude and longitude because the radio range of the base station is generally much less than 100 km corresponding roughly to one degree, over most of the surface of the Earth. In addition, depending on the spatial resolution required, it may not be necessary to indicate the coordinates to high precision. For example, a code including just the third, fourth, and fifth digit after the decimal point in decimal-degree notation may be sufficient to provide meter-scale resolution within a kilometer range, which may be sufficient for traffic applications and industrial automation applications, among others.

The speed field 406 may indicate the speed of the user device in units of, for example, meters per second. The direction field 407 may indicate the compass heading of the user device, or other measure of the direction of travel. This may be encoded as four bits providing an angular resolution of 22.5 degrees, or other encoding depending on the angular resolution required. The flags 408 may indicate, among many other things, whether the user device is accelerating, decelerating, or maintaining a constant velocity, which may help the receiving entity to extrapolate future positions. The error-check field 409 may include a parity code or a CRC or other code configured to reveal message faults.

Figure 4B:
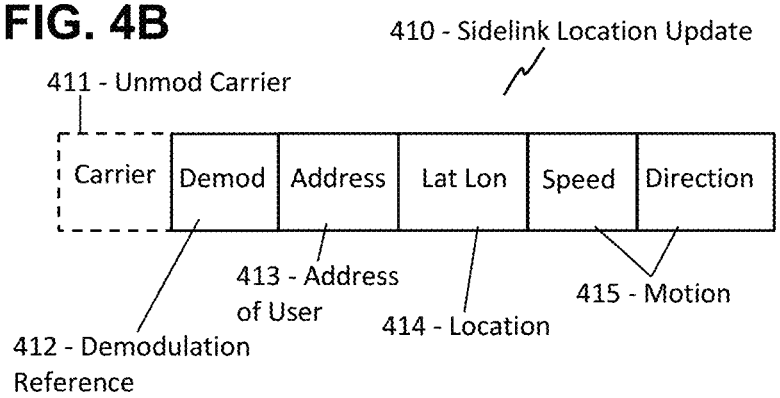
FIG. 4B is a schematic showing an exemplary embodiment of a message format for user devices to indicate locations to other user devices, according to some embodiments.

FIG. 4B is a schematic showing an exemplary embodiment of a message format for user devices to indicate locations to other user devices, according to some embodiments. As depicted in this non-limiting example, a sidelink location update message 410 may be broadcast by a mobile user device to inform other mobile and fixed user devices of the transmitting user device's location and motion. In this example, a base station is not involved. The message 410 may include an optional "carrier" field 411 with unmodulated carrier signal, a demodulation reference 412, an address field 413, a location field 414, and a motion field 415 including speed and direction.

The carrier field 411 may be provided to assist other user devices in determining the frequency of the rest of the message. The frequency may be affected by drifts in the time-base of the transmitting or receiving user device, Doppler shifts in frequency due to the motions of the user devices, and other effects. The carrier field 411 may enable the receiving entity to adjust its time-base for optimal reception of the rest of the message. The demodulation reference 412 may be a regular DMRS (demodulation reference signal) which is generally encoded in a complex way. Alternatively, the demodulation reference 412 may be a low-complexity short-format demodulation reference with two reference elements, configured to exhibit the maximum and minimum amplitude levels, and the maximum and minimum phase levels, of the modulation scheme, from which the remaining levels can be calculated by interpolation. Alternatively, the short-format demodulation reference 413 may include four reference elements, exhibiting all of the amplitude levels and phase levels of 16QAM, or all of the phase levels in QPSK, for example, so that no interpolation is needed. Providing the demodulation reference 412 within the message 410 may assist the other user devices in demodulating the rest of the message.

The address field 413 may include a wireless address such as a user-selected code of 8 or 12 or 16 bits, configured to be different for each of the user devices in range of each other, for example. The location field 414 may include the latitude and longitude of the user device, optionally abbreviated as described above. The motion fields 415 may indicate the speed and direction of the user device, as described above. Mobile user devices such as vehicles in traffic may exchange sidelink location update messages as shown to inform each other of their presence, location, and motion, so that the other user devices can transmit to them using an appropriate power level, and so that collision-avoidance software can use the data to construct a local traffic map and thereby detect imminent collisions, among other uses.

Figure 5A:
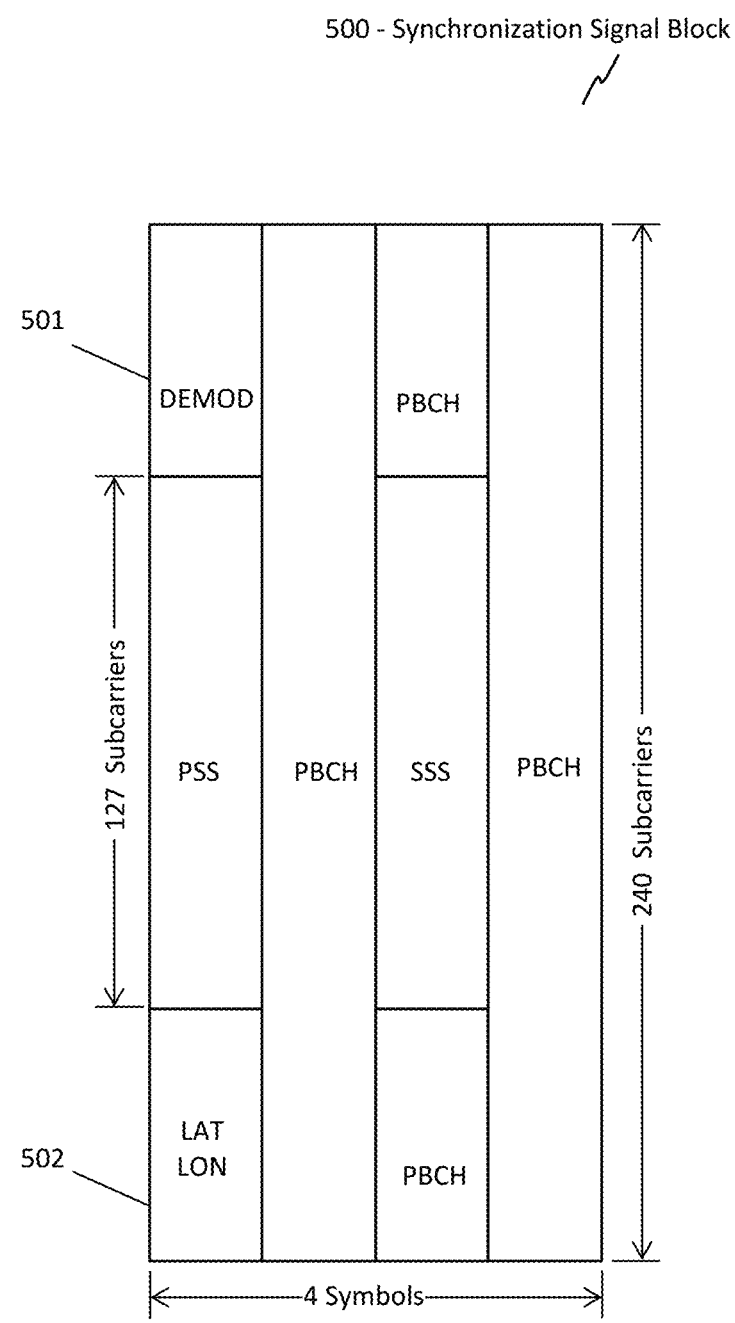
FIG. 5A is a schematic showing an exemplary embodiment of a message format for base stations to indicate locations to user devices, according to some embodiments.

FIG. 5A is a schematic showing an exemplary embodiment of a message format for a base station to indicate its location to user devices, according to some embodiments. As depicted in this non-limiting example, a modified SSB (synchronization signal block) 500 in 5G/6G includes 4 symbol times and 240 consecutive subcarriers, all modulated in QPSK. Within the message 500 are a PSS (primary synchronization signal) of 127 subcarriers, a SSS (secondary synchronization signal) also 127 subcarriers, and four regions with PBCH (physical broadcast channel) which, in this context, includes the MIB (master information block). The PSS, SSS, and PBCH(MIB) provide system information that a user device may require, in order to receive messages on a particular cell. The remaining two regions, indicated as 501 and 502, are unassigned in 5G/6G.

In the depicted embodiment, a demodulation reference is inserted into the first unassigned region 501, to assist user devices in demodulating the rest of the message, and a location is inserted into the second unassigned region 502, indicating the latitude and longitude of the base station (or the antenna of the base station). The full geographical location of the base station may include eight digits for each of the latitude and longitude in decimal degrees, for example, thereby providing about one-meter resolution. The number of bits needed for this resolution is about 53 or 54 depending on encoding, or 27 resource elements at QPSK. Thus the full geographical coordinates can fit within the second region 502, which includes 56 or 57 subcarriers. Thus the base station can indicate, in its SSB message, its location at meter-scale resolution, with no increase in the bandwidth required, and no increase in the time required, for the message.

Figure 5B:
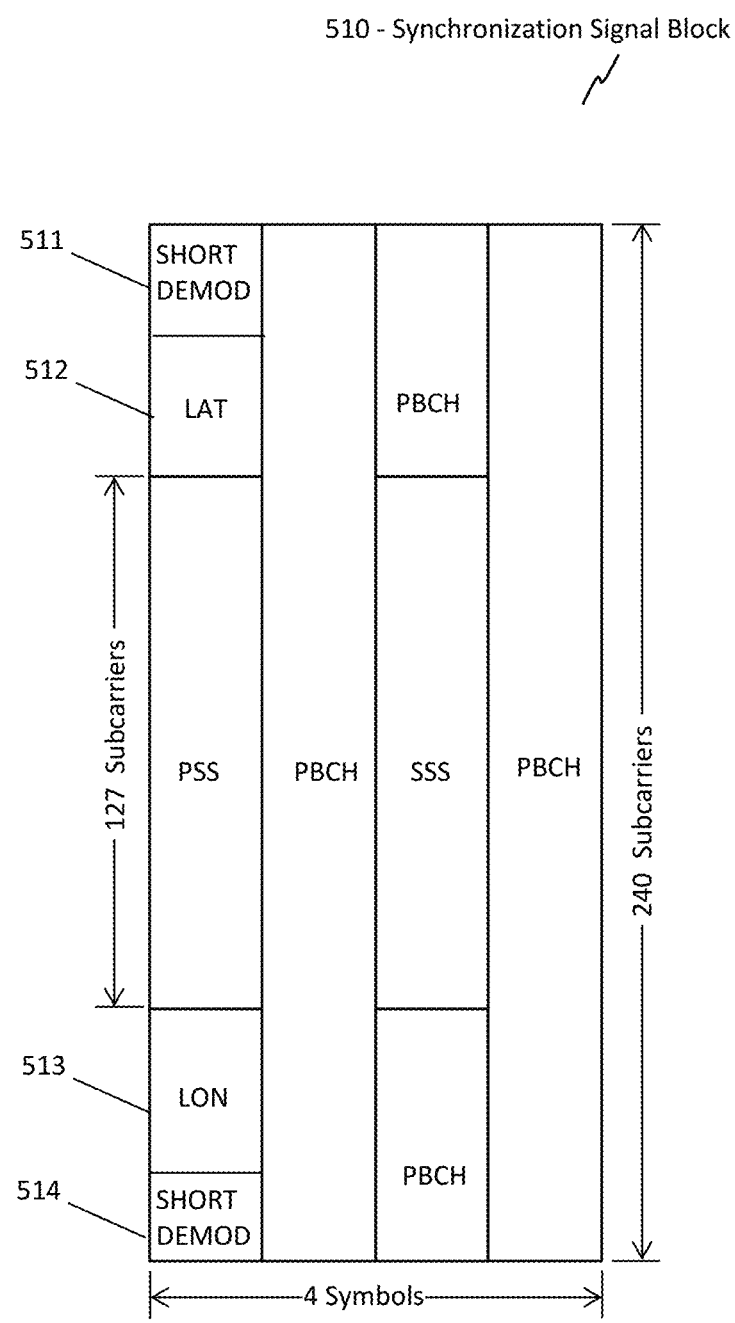
FIG. 5B is a schematic showing another exemplary embodiment of a message format for base stations to indicate locations to user devices, according to some embodiments.

FIG. 5B is a schematic showing another exemplary embodiment of a message format for base stations to indicate locations to user devices, according to some embodiments. As depicted in this non-limiting example, another modified SSB message 510 may include the usual PSS-SSS-PBCH(MIB) structure, plus four new items in the previously unallocated fields of the first symbol time. The modified SSB message 510 may include a short-form demodulation reference 511, shown in the four highest-frequency subcarriers, followed by the latitude value 512. After the PSS, the longitude value 513 is shown followed by another short-form demodulation reference 514 in the lowest-frequency subcarriers. Each of the short-form demodulation references 511 and 514 is four consecutive reference elements of the message 510, modulated according to all four values of the phase used in the modulation scheme. (There is no amplitude modulation in QPSK). By providing the short-form demodulation references at the highest and lowest frequency subcarriers, within the message body 510, the rest of the message may be demodulated despite interference and noise. For example, each element of the message 500 may be compared to an interpolated, or weighted average, of the modulation levels exhibited in the short-format demodulation references 511 and 514. Since the demodulation references 511 and 514 are generally affected by noise and interference in the same way as the rest of the message, each message element may be demodulated according to the interpolated average of the two demodulation references 511 and 514, thereby mitigating the noise and interference including frequency-dependent noise and interference, according to some embodiments.

As another option, the location data may be included in or appended to the PBCH by declaring a new format that includes the latitude and longitude of the base station.

As a further example, the location information may be included with or appended to an SIB1 message, which is a message broadcast periodically by the base station indicating how new users can transmit messages to the base station. By receiving the SSB or the SIB1 message modified to include the base station's latitude and longitude, new user devices can thereby determine the location of the base station.

Figure 5C:
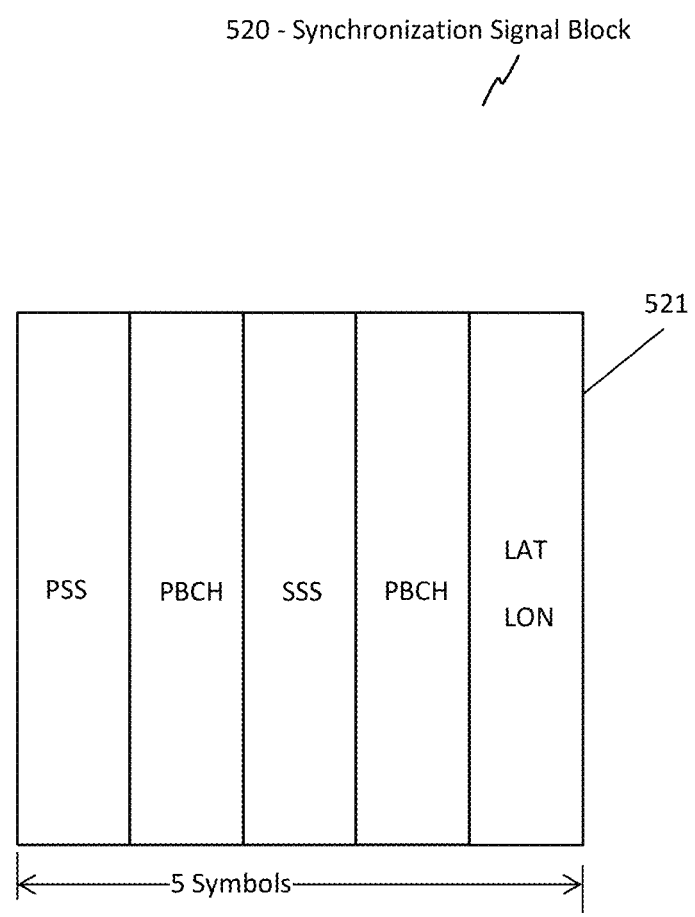
FIG. 5C is a schematic showing an exemplary embodiment of a low-complexity message format for base stations to indicate locations to user devices, according to some embodiments.

FIG. 5C is a schematic showing an exemplary embodiment of a low-complexity message format for a base station to indicate its location to user devices, according to some embodiments. As depicted in this non-limiting example, in a low-complexity SSB message 520, the bandwidth may be reduced to that required for transmitting the PSS and SSS portions, and the size of the BPCH portions may be reduced by reducing the number and complexity of parameters, and a fifth symbol 521 may be added. The fifth symbol 521 may contain the latitude and longitude, and optionally other data, of the base station.

Alternatively, the location data may be included in the PBCH, and a fifth symbol may be added to accommodate the PBCH with the location data included.

An advantage of providing the base station location in the SSB message may be to inform each new arrival user device of the base station's location before the user device attempts to acquire further system information and begin transmitting to the base station. An advantage of placing two short-form demodulation references at the top and bottom subcarriers may be that frequency-dependent interference and external noise can be mitigated by comparing the phase of each message element to the two short-form demodulation references 511 and 514 or to an interpolated average of the corresponding phase values. An advantage of informing user devices of the base station's location may be that the user devices can then adjust their transmit power for satisfactory reception at the base station without a power scan. An advantage of including the base station's location information in an SIB1 message instead of the SSB message may be that the SSB message may remain unmodified.

The systems and methods disclosed herein further include location-based beamforming, in which a base station and a user device are in communication, and each entity determines the location of the other entity, calculates a direction based on the difference between their locations, and aims a unidirectional transmission or reception beam toward the other.

Figure 6A:
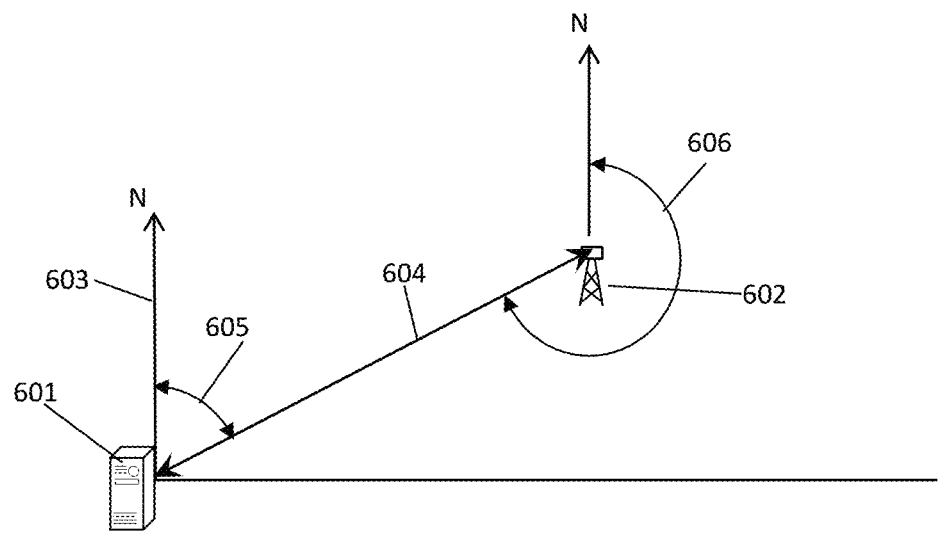
FIG. 6A is a sketch showing an exemplary embodiment of a user device communicating with a base station, according to some embodiments.

FIG. 6A is a sketch showing an exemplary embodiment of a user device communicating with a base station, according to some embodiments. As depicted in this non-limiting example, a user device 601, depicted as a computer, is in communication with a wireless network base station 602, depicted as an antenna, in a coordinate system 603 with north indicated as "N". The user device 601 and the base station 602 each determines its own location, such as latitude and longitude, or other measure of location that the other entity can recognize. An angle 605 indicates the direction from the user device 601 toward the base station 602 relative to north, and another angle 606 indicates the angle from the base station 602 toward the user device 605, relative to the coordinate system 603 or north. Alternatively, and equivalently, the line 604 between the two entities indicates the direction of the base station 602 as viewed by the user device 601, and also the direction of the user device 601 as viewed by the base station 602. If the user device 601 and the base station 602 both know their own location, and they also know the location of the other entity, then they can calculate the angles 605-606, and thereby determine the direction toward the other entity.

Figure 6B:
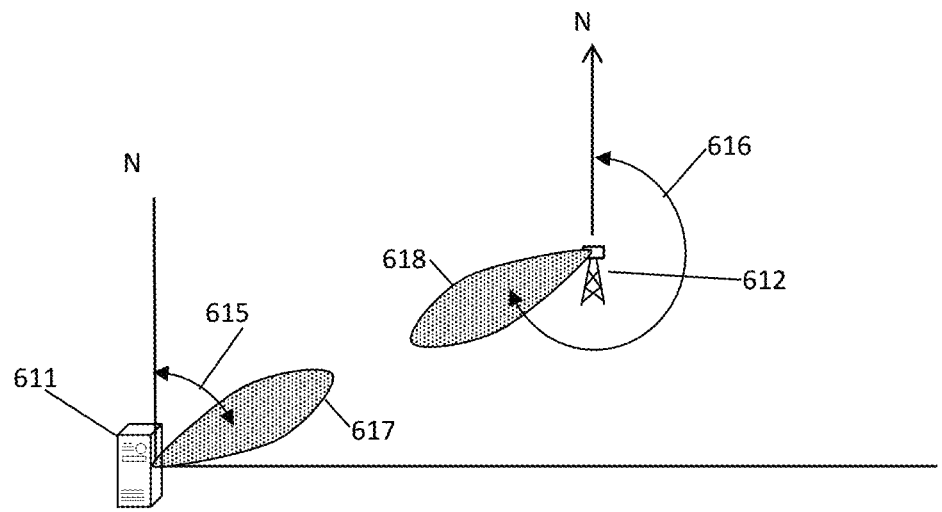
FIG. 6B is a sketch showing an exemplary embodiment of a user device communicating with a base station using directed beams, according to some embodiments.

FIG. 6B is a sketch showing an exemplary embodiment of a non-mobile user device communicating with a base station using directed beams, according to some embodiments. As depicted in this non-limiting example, a non-mobile user device 611 and a base station 612 can communicate unidirectionally. The user device 611 and the base station 612 can exchange messages indicating their own locations. The user device 611 can then calculate an angle 615 toward the base station 612 and prepare a transmission or reception uplink beam 617 (stippled figure emanating from the user device 611) aimed according to the direction of the base station. Likewise, the base station 612 can calculate the angle 616 toward the user device 611 and prepare a transmission or reception downlink beam 618 aimed in the direction toward the user device 611. The user device 611 and the base station 612 can then communicate unidirectionally thereafter by transmitting and receiving messages according to their beams 617, 618.

As mentioned, a transmission beam is a directional distribution of emitted radio energy (comprising electromagnetic waves) with a maximum power in a particular direction, and the transmission beam is "aimed at" a second entity by arranging the particular direction to be the direction toward the second entity. Likewise, a reception beam is a directional distribution of received radio energy with a maximum receptivity in a particular direction, and the reception beam is aimed at a second entity by arranging the particular direction to be the direction toward the second entity. A transmission or reception beam is "prepared" by arranging electronics in a multi-part antenna to direct the maximum emitted power, or the maximum receiver sensitivity, in the particular direction.

In some embodiments, the base station 612 may indicate its own location in an SSB or SIB1 system information message, which the base station 612 may periodically broadcast omnidirectionally, and the user device 611 can receive omnidirectionally and thereby determine the location of the base station 612. Alternatively, the base station may transmit its location data to the user device 611 in a separate message, such as an RAR (random access response) message or a Msg4 (fourth initial-access message) or supplementary system information messages or a separate message, for example. The user device 611 can then calculate the angle 615 toward the base station 612 and thereby determine a direction toward the base station 612, prepare an uplink transmission beam 617 aimed toward (in the direction of) the base station 612 according to the angle 615, and then transmit an uplink message unidirectionally. The uplink message may be one of the 5G/6G initial access messages, such as the random access preamble or the Msg3 (third initial-access message), but modified to indicate the location of the user device 611. Alternatively, the user device 611 may transmit a separate message later, after the initial access procedure has been completed, indicating the location of the user device 611. In either case, the base station 612 can thereby determine the location of the user device 611, calculate the angle 616 toward the user device 611 (and hence the direction toward the user device 611), and prepare a downlink transmission or reception beam 618 aimed at the user device 611 by adjusting electronics in the base station's antenna.

In other embodiments, the user device 611 may determine the location of the base station 612 before receiving messages from the base station 612. For example, the user device 611 may read the location from a network database or other tabulation of base station information, or by remembering a previous registration on the base station 612, or informed by communication with some other base station, for example. In each case, the user device 611 can calculate the angle 615 toward the base station 612 and the associated direction, and can prepare a downlink reception beam 617 aimed at the base station 612 before receiving the SSB and SIB1 messages, and may thereby obtain enhanced signal quality in receiving those messages.

In other embodiments, the user device 611 may indicate its location in a broadcast omnidirectional message, such as a hailing message, or other message requesting a reply from proximate base stations. In that case, a replying base station can indicate its location in its reply message. Then, based on their relative locations, the two entities can exchange messages unidirectionally thereafter, that is, using transmission and reception beams aimed at the other entity.

In other embodiments, the user device 611 may be incapable of transmitting or receiving unidirectionally, whereas the base station 612 may have an articulated (or multi-part) antenna and suitable electronics to transmit and receive unidirectionally. In that case, the user device 611 may transmit a message to the base station 612 indicating the user device's location so that the base station 612 can transmit and receive unidirectionally. The user device 611 may continue to receive and transmit omnidirectionally.

In other embodiments, two base stations in different cells may communicate unidirectionally with each other, by first determining each other's locations, calculating a direction toward the other, and transmitting or receiving unidirectionally thereafter. The base stations may thereby communicate with each other without interfering with user devices that are operational on the same frequency band, since the directional transmissions and receptions may be made narrow and focused on the other base station, thereby limiting the power required, and also minimizing stray radiation such as sidelobes and the like.

Figure 6C:
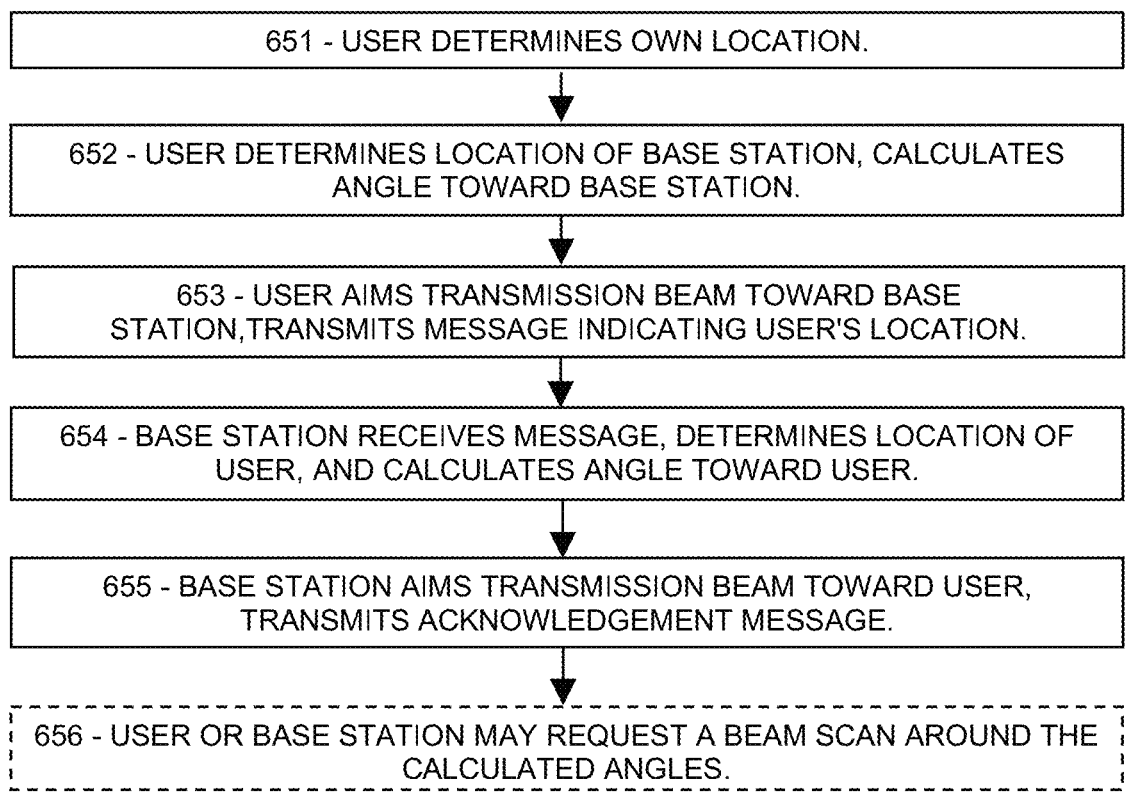
FIG. 6C is a flowchart showing an exemplary embodiment of a procedure for a user device to communicate with a base station using directed beams, according to some embodiments.

FIG. 6C is a flowchart showing an exemplary embodiment of a procedure for a user device to communicate with a base station using directed beams, according to some embodiments. As depicted in this non-limiting example, at 651 a user device determines its own location using, for example, GPS or other satellite-based navigation system, or by a known address or map, or pre-programmed in the user device, or other means for determining a location. At 652, the user device determines the location of a base station (or more preferably, the base station's antenna) using, for example, messages from the base station indicating its location, or by reading an entry in a network database or other tabulation of base station information, or by other means for determining the location of the base station. The user device can then calculate an angle toward the base station relative to north or another coordinate standard, and thereby determine a direction toward the base station. At 653, the user device can aim an uplink transmission beam at the base station's direction relative to the user device's position, and can transmit an uplink message to the base station using the transmission beam. For example, the user device may include an articulated or sectioned or phased-array or other type of directional antenna, and may drive the antenna electronics so as to transmit power nonuniformly, with a maximum emitted power density in the direction of the base station. The message may indicate the location of the user device, or the angle of the base station relative to the user device, or 180 degrees plus the angle of the base station relative to the user device (modulo 360 degrees) or other indication or data enabling the base station to calculate the direction toward the user device relative to the base station.

At 654, the base station has received the message and determined the user device's location. The base station can then calculate an angle or direction toward the user device from the base station relative to a geographical direction such as north. At 655, the base station can then aim a downlink transmission beam toward the user device, according to the angle of the user device from the base station, and can then transmit, unidirectionally and unicast, an acknowledgement or other message to the user device.

Optionally, at 656, the user device and/or the base station may request a beam scan to perform a fine-adjustment or confirmation of the transmission or reception direction. The optimal direction may differ (usually only slightly) from the location-based angles due to scattering or reflections or other effects on the transmitted energy. However, since the location-based directions (determined from the locations of the user device and the base station) are already known to the entities, and the optimal beam directions are likely very close to the location-based directions, a full scan may not be needed. Instead, an abbreviated beam scan may be sufficient, for example by varying the transmission or reception beam angle on both sides of the location-based angle and determining whether the reception increased. In some embodiments, the abbreviated beam scan may include just three transmissions, with the transmission or reception beam aimed according to the location-based angle, the location-based angle plus a small amount, and the location-based angle minus the small amount. The small amount may be a predetermined amount such as 2 or 5 or 10 or 20 degrees, for example. If the abbreviated scan indicates that the best reception is obtained at an angle other than the location-based angle, or other unexpected result occurs, the user device or the base station may request a full beam scan.

In another embodiment, a user device may be in communication with a base station, and the base station may be capable of beamforming as discussed, but the user device may be incapable of beamforming due to lack of a directional antenna. In that case, the user device may transmit, omnidirectionally, a message to the base station indicating the user device's location. The base station may receive the message, determine a direction toward the user device, and transmit a directional beamed reply to the user device. The two entities may continue to communicate in similar fashion, with the user device transmitting and receiving non-directionally, and the base station transmitting and receiving using beams aimed at the user device. The base station may thereby save energy and reduce generation of backgrounds by transmitting downlink messages in a transmission beam. In addition, the user device may reduce its transmitted power due to the increased sensitivity of the base station's reception beam. In addition, both entities may obtain increased reliability and reduced message faults due to the exclusion, by the base station's transmission and reception beams, of radio source outside the directed beams.

Figure 7A:
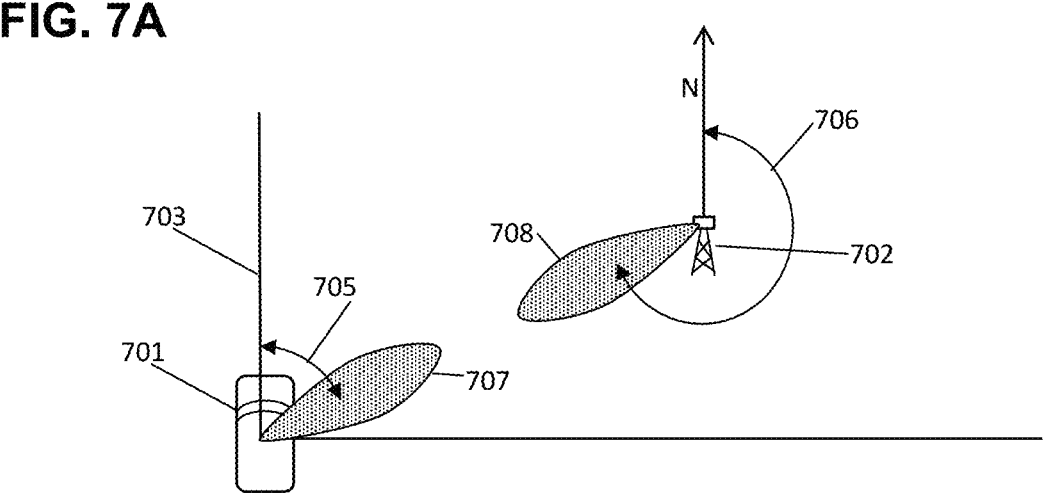
FIG. 7A is a sketch showing an exemplary embodiment of a mobile user device communicating with a base station using directed beams, according to some embodiments.

FIG. 7A is a sketch showing an exemplary embodiment of a mobile user device communicating with a base station using directed beams, according to some embodiments. As depicted in this non-limiting example, a mobile user device 701 may communicate with a base station 702 while driving on a road 703 which, in this case, happens to point north. The mobile user device 701 has determined an angle 705 toward the base station 702 and arranged an uplink transmission or reception beam 707 aimed at the base station 702. The base station 702 has determined another angle 706 toward the mobile user device 701 and prepared a downlink transmission or reception beam 708 aimed at the mobile user device 701. The two entities 701-702 may then communicate unidirectionally. Each entity prepares a directional beam by powering various sections of a multi-part antenna so as to provide the maximal transmitted power or the maximal received sensitivity in a particular direction, as mentioned.

Figure 7B:
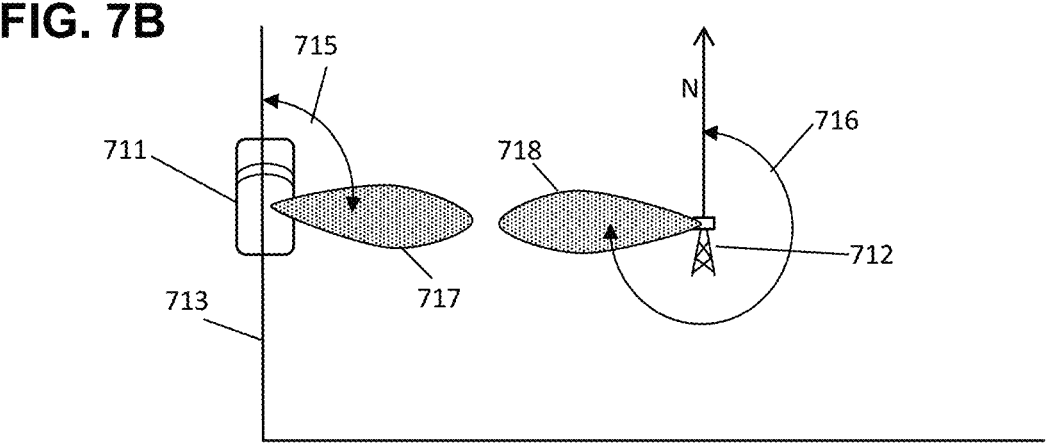
FIG. 7B is a sketch showing an exemplary embodiment of a mobile user device communicating with a base station using directed beams after moving, according to some embodiments.

FIG. 7B is a sketch showing an exemplary embodiment of a mobile user device communicating with a base station using directed beams after moving, according to some embodiments. As depicted in this non-limiting example, the mobile user device 711 has now traveled along the road 713 relative to the position in FIG. 7A. Knowing its own location, the mobile user device 711 can then recalculate the direction 715 toward the base station and revise the uplink transmission or reception beam 717 accordingly to remain aimed at the base station 712 despite the motion. In addition, the base station 712, knowing the speed and direction of the mobile user device 711, can calculate the new location of the user device 711 versus time by assuming, for example, that its speed and direction of travel remain constant during the elapsed interval. Based on the updated location of the mobile user device 711, the base station 712 can then recalculate the angle 716 toward the mobile user device 711, and can then rearrange the downlink transmission or reception beam 718 accordingly, to remain aimed at the mobile user device 711. The base station 712 may continue to determine the location of the mobile user device 711 periodically by such a calculation, without the need for the mobile user device 711 to transmit an updated location message or to perform a beam scan, thereby saving time and energy.

If, on the other hand, the mobile user device 711 changes speed significantly, the mobile user device 711 may then transmit an updated location, speed, and direction of travel message (that is, a message indicating the updated location, speed, and direction of travel of the user device) to the base station 712. In this context, "changes speed significantly" includes changing speed, relative to the previously reported speed, by a sufficient amount and for a sufficient interval, that the downlink transmission or reception beam 718 would be directed away from the actual location of the mobile user device 711. The mobile user device 711 may calculate how large the accumulated location error has become between its actual location and the calculated location that base station 712 may have calculated. For example, the mobile user device 711 may integrate its speed over time and determine how far the resulting value differs from that obtained by assuming a constant speed. If the accumulated position error has increased sufficiently to cause the transmission or reception beam to miss the mobile user device 711, then the mobile user device 711 may calculate a corrected angle toward the base station 712 based on its actual location, and may then re-aim the uplink beam to be directed toward the base station 712, and transmit an updated location, speed, and direction of travel message. Likewise, the base station 712 can redirect its downlink beams according to the updated location of the mobile user device 711.

Figure 7C:
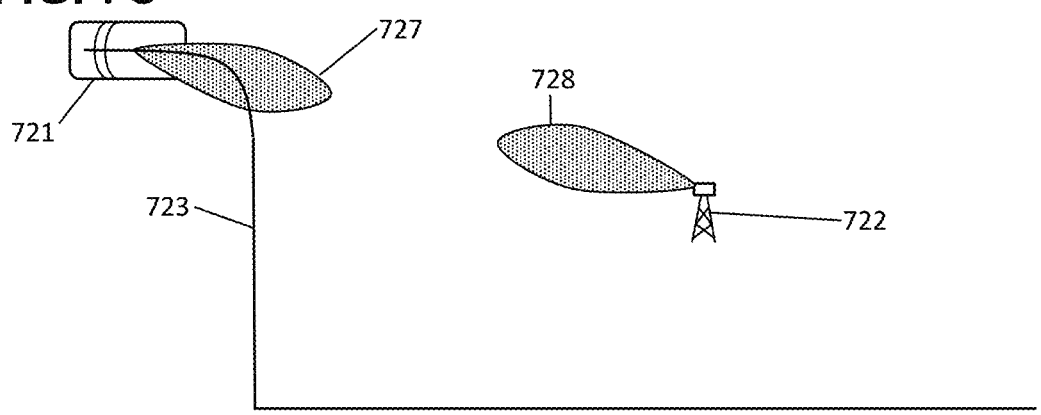
FIG. 7C is a sketch showing an exemplary embodiment of a mobile user device communicating with a base station using directed beams after turning, according to some embodiments.

FIG. 7C is a sketch showing an exemplary embodiment of a mobile user device communicating with a base station using directed beams after turning, according to some embodiments. As depicted in this non-limiting example, a mobile user device 721, traveling along a curved road 723, has turned relative to the previous examples. The mobile user device 721 may include a compass or gyro or other device indicating the orientation of the mobile user device 721. The mobile user device 721 may then redirect its uplink transmission or reception beam 727 toward the location of the base station 722 accordingly (that is, compensating for the turn). In addition, the mobile user device 721 may transmit an updated location, speed, and direction of travel message to the base station 722, indicating the change in direction.

In another embodiment, the base station 722 may include a digital map including the locations and directions of roads within its range, and may have determined, from the original location message for example, that the mobile user device is on a particular road, such as the curved road 723. For example, the base station may include a map such as a digital map in memory, or other information resource that correlates locations with roads or other physical structures, and may thereby determine which road the user device 721 is on. Hence, the base station 722 may have determined which road the mobile user device 721 is on based on location and the map, without the mobile user device 721 explicitly indicating which road it is on. The base station 722 may then calculate a time at which the mobile user device 721 will turn, based on its speed and the shape of the road 723. The base station 722 may thereby calculate the location of the mobile user device 721 at subsequent times, including turns in the road 723. In that case, the base station 722 can recalculate the angle toward the mobile user device 721 after the turn, and may thereby maintain the downlink transmission or reception beam 728 aimed at the mobile user device 721 as the user device 721 travels, without the need for a further message indicating the location, speed, and direction of travel of the mobile user device 721, as long as the mobile user device 721 proceeds predictably along the road 723.

An advantage of a mobile user device informing a base station of the location, speed, and direction of travel of the mobile user device may be that the base station may maintain communication with the mobile user device with transmission and reception beams, by calculating and updating the angle toward the mobile user device over time, and adjusting the beam direction accordingly. An advantage of the base station determining a particular road that the mobile user device is on, may be that the base station may calculate and update the angle toward the mobile user device as the mobile user device proceeds along the road.

Figure 7D:
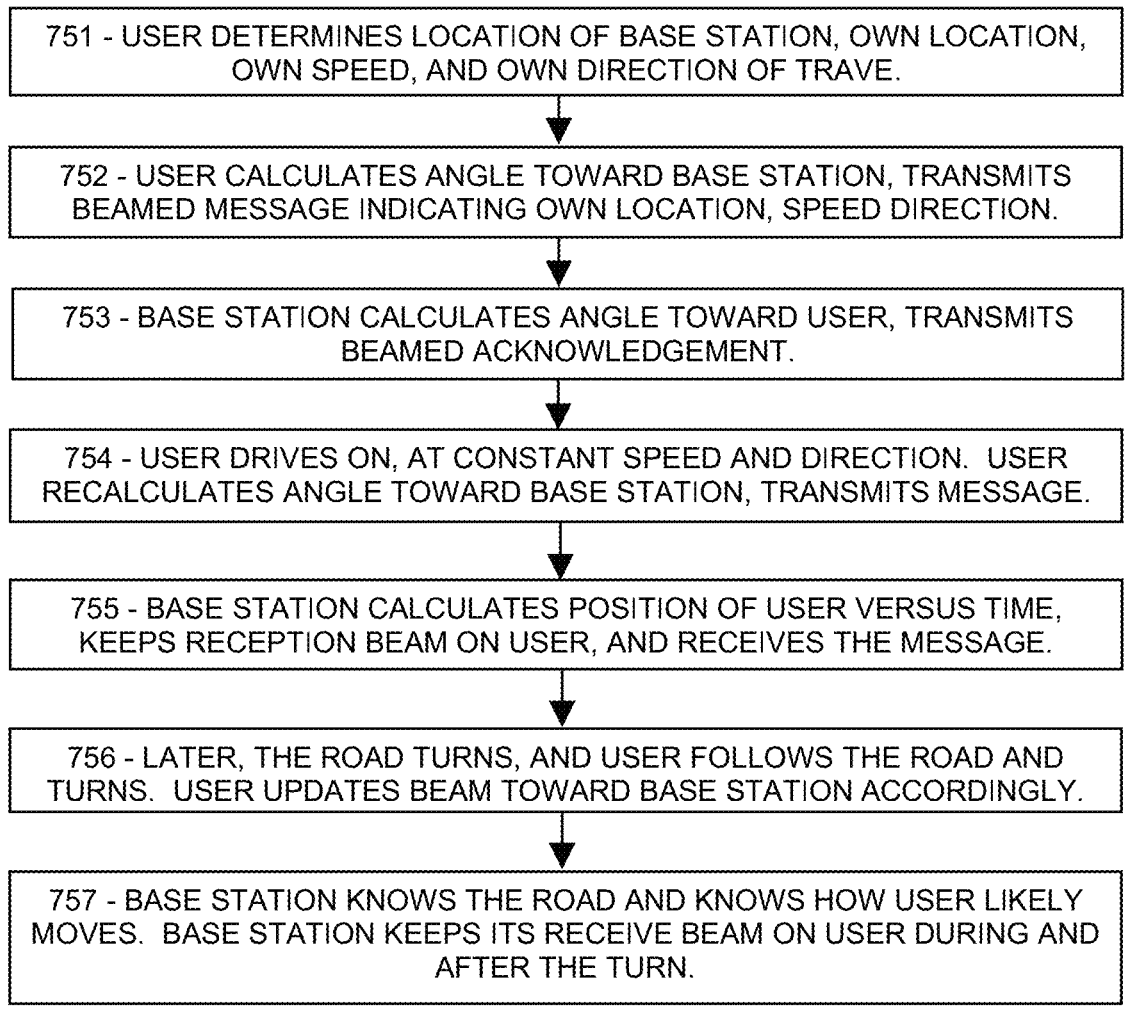
FIG. 7D is a flowchart showing an exemplary embodiment of a procedure for a mobile user device to communicate with a base station using directed beams, according to some embodiments.

FIG. 7D is a flowchart showing an exemplary embodiment of a procedure for a mobile user device to communicate with a base station using directed beams, according to some embodiments. As depicted in this non-limiting example, at 751 a mobile user device determines its own location, speed, and direction of travel, and also determines a location of a base station (or other wireless entity). At 752, the mobile user device calculates an angle toward the base station and transmits an uplink message beamed toward the base station, the message indicating the location, speed, and direction of travel of the mobile user device. At 753, the base station receives the message and calculates an angle toward the mobile user device, prepares a downlink transmission beam aimed at the mobile user device, and transmits an acknowledgement message (or other message) to the mobile user device.

At 754, the mobile user device has driven farther along a road for an interval of time at a constant speed, and therefore has changed location. The user device then recalculates the direction toward the base station based on the changed location of the user device, adjusts the uplink transmission or reception beams, and transmits a second message. At 755, the base station has calculated the new location of the mobile user device assuming that the speed and direction of travel have remained constant during the interval, and thereby adjusts its transmission and reception beams to remain aimed at the mobile user device. The base station then receives the second message.

At a later time 756, the mobile user device reaches a turn in the road, and the mobile user device follows the road, turning accordingly. The mobile user device determines its changing direction of travel using, for example, a gyro or compass or by interpreting images of the surrounding scene. The mobile user device thereby corrects the angle of its uplink beam to remain aimed at the base station. At 757, the base station has determined which road the mobile user device is on, based on its earlier location message for example, and has used a map (or equivalent information) to determine that the mobile user device has likely turned, following the road. Optionally, the base station may also know, from past data or from current traffic conditions, where the mobile user device is expected to slow down or speed up. Using current traffic conditions, for example, the base station can recalculate the expected speed as a function of time, including traffic slowdowns and the like, and may thereby determine the mobile user node's current location by integrating the speed over time. The base station can then continue to calculate the mobile user device's location and can continue to keep the downlink beam aimed at the mobile user device, and can thereby continue unidirectional communication, without performing a beam scan and without further exchange of location, speed, and direction messages, unless the speed or direction of travel changes differently from what the base station expects according to the road and traffic conditions.

In another embodiment, two mobile user devices may be in motion and may be communicating with each other. One or both of the mobile user devices may include a map or equivalent, indicating routes of travel. One or both of the mobile user devices may be capable of beamforming. In that case, the two mobile user devices may exchange messages indicating their location, speed, and direction of travel. The two mobile user devices may calculate, based on those messages, a distance between the two mobile user devices, an angle and direction toward the other mobile user device as a function of time, and optionally a route of travel for each mobile user device based on the map or maps. In addition, the mobile user devices that are capable of beamforming may prepare transmission and reception beams aimed at the other mobile user device according to the calculated direction. One or both mobile user devices may update those beams as the relative positions and orientations of the two mobile user devices change over time by calculating the relative positions and by following a route on the map, for example. The mobile user devices may thereby save energy, improve reliability, save time, and reduce interference generation, while avoiding additional beam scanning and additional location messages, according to some embodiments.

Figure 8A:
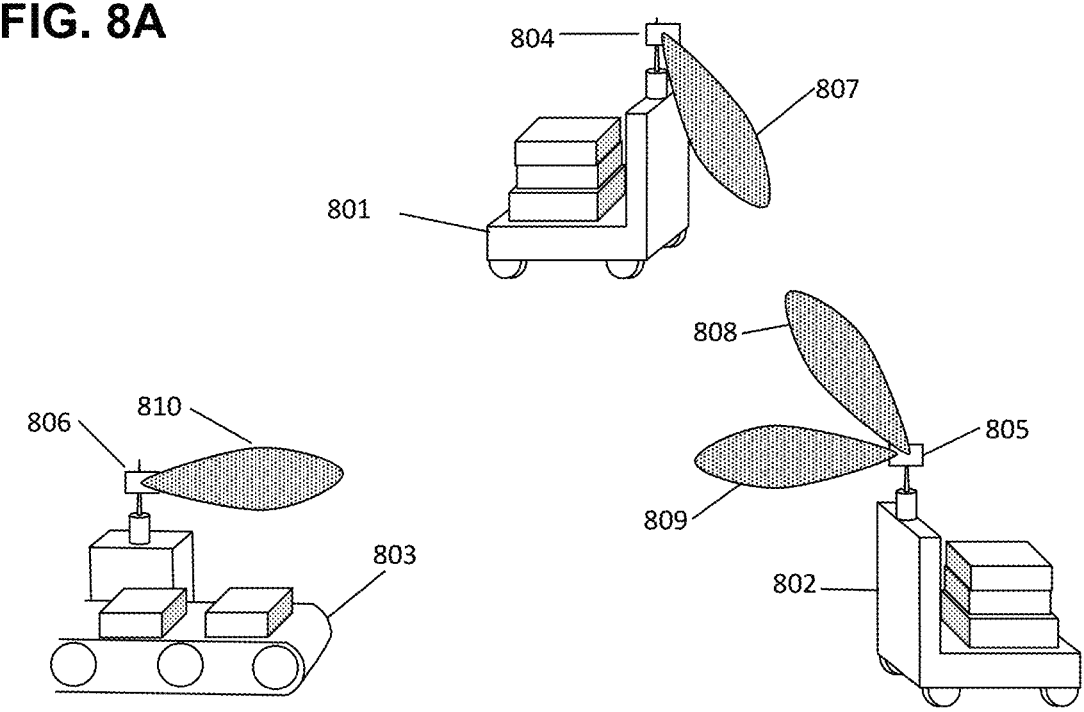
FIG. 8A is a sketch showing an exemplary embodiment of mobile user devices communicating in sidelink using directed beams, according to some embodiments.

FIG. 8A is a sketch showing an exemplary embodiment of mobile user devices communicating in sidelink using directed beams, according to some embodiments. As depicted in this non-limiting example, three user devices 801, 802, 803, depicted as mobile industrial robots 801-802 or fixed industrial machinery 803, are in communication with each other, using sidelink messaging with beamforming. Each user device 801, 802, 803 includes a beamforming antenna 804, 805, 806 capable of unidirectional transmission and reception. Each user device 801, 802, and 803 has determined its location using, for example, GPS or other satellite-based navigation system. Alternatively, when the user devices 801-803 are inside a building, a short-range interior locating system may be provided so that the user devices 801-803 can determine their positions locally, not dependent on satellite signals. For example, the short-range locating system may include transmitting radio signals or ultrasound or light pulses or other energy detectable by each user device, or by providing markers such as a location grid painted on a floor or ceiling, or an electromagnetic grid embedded in the floor or ceiling, for example. In the example, the user devices 801, 802, and 803 have exchanged messages indicating their locations and, optionally, their planned routes of travel and speeds. The user devices 801, 802, 803 may also (or alternatively) transmit their location messages to a supervisor entity such as a central computer, and the supervisor entity may then provide that location data available to each user device.

One of the depicted user devices 803 is an item of fixed (non-mobile) machinery 803, and therefore may not need to transmit location messages (as long as the mobile entities already know the location of the non-mobile entity). The user devices 801, 802, 803 may communicate with each other using sidelink unicast unidirectional messaging, by calculating the current position of other user devices and arranging transmission and reception beams accordingly. More specifically, the first user device 801 may calculate its current location, and may also determine the location of the second user device 802 by exchanging location messages (or by interrogating a central data repository of user device locations, or by calculating where the second user device 802 is supposed to be at a given time based on a prior location and motion message, or otherwise determine the second user device's location).

The first user device 801 may then calculate an angle toward the second user device 802, based on the second user device's location, and may thereby establish a transmission and reception beam 807 aimed at the second user device 802. Likewise, the second user device 802 may calculate, or determine by message exchange, the location of the first user device 801, and thereby direct a transmission or reception beam 808 toward the first user device 801. In a similar fashion, the second and third user devices 802, 803 may direct their unidirectional beams 809, 810 toward each other. The second user device 802 is shown with two unidirectional beams 808 and 809. The second user device 802 may maintain both beams by rapidly alternating reception between the two directions, or by digitally analyzing received signals to separately resolve signals from the first and third user devices 801,803 or with another suitable electronic or software means for receiving signals from the other two user devices 801, 802 concurrently. Not shown, but also possible, the first and third user devices 801, 803 may direct beams toward each other.

An advantage of fixed and mobile industrial robots, and other autonomously cooperating wireless entities, communicating with each other in sidelink unidirectional communications, may be that they can cooperate in performing their separate tasks more effectively, by exchanging location and motion messages and directing transmission and reception beams at each other. More specifically, mobile robots may cooperate with each other, and with fixed machinery, while avoiding collisions, by exchanging location messages so that the other robots can determine where each device is located, without the need for beam scanning. In addition, a central or supervisory entity can keep track of the operations by monitoring the location and motion messages, and thereby manage the operations more effectively than without that information.

Figure 8B:
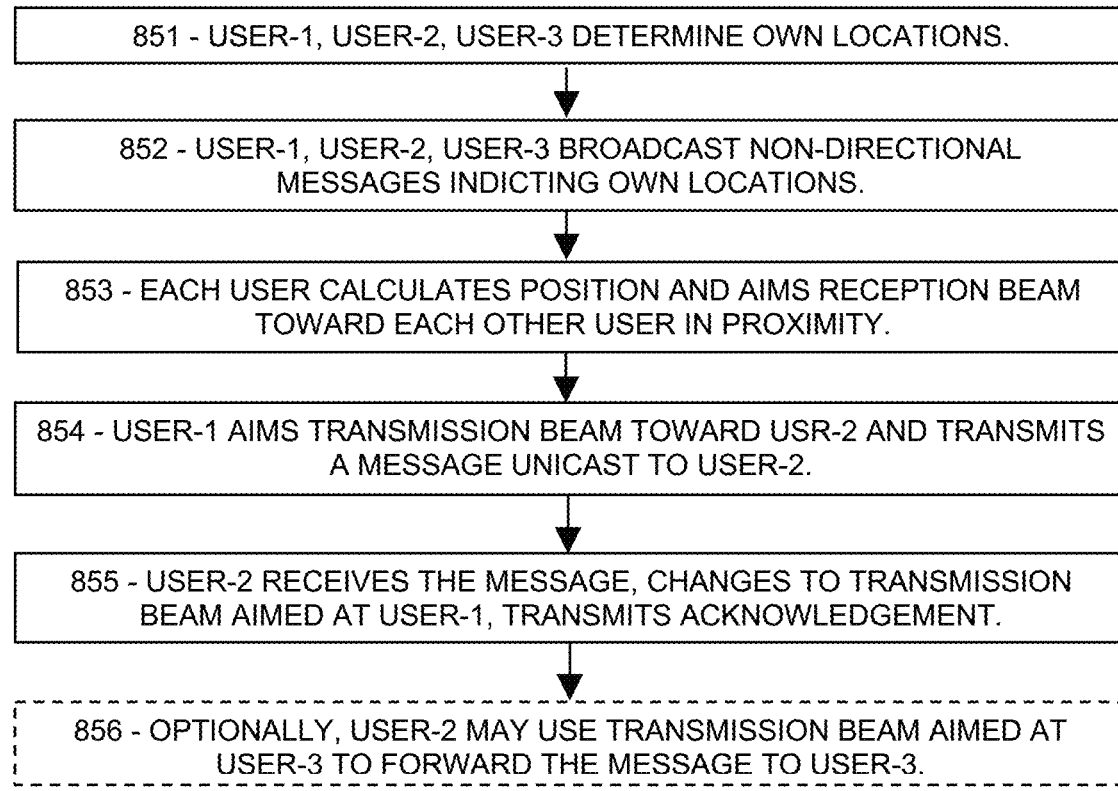
FIG. 8B is a flowchart showing an exemplary embodiment of a procedure for mobile user devices communicating in sidelink using directed beams, according to some embodiments.

FIG. 8B is a flowchart showing an exemplary embodiment of a procedure for mobile user devices communicating in sidelink using directed beams, according to some embodiments. As depicted in this non-limiting example, at 851 three industrial user devices, user-1, user-2, and user-3, determine their own locations by satellite signals, or by internal signals localized to a building, or otherwise. At 852, each user device broadcasts its location information omnidirectionally so that all other user devices in proximity can determine each item's location. At 853, each of the user devices calculates an angle, based on its own location and the location of another user device, and aims a transmission or reception beam toward the other user device. At 854, user-1 determines the location of user-2, prepares a transmission beam toward user-2 by programming antenna elements (or other suitable beamforming system), and thereby transmits a unicast message unidirectionally, toward user-2. At 855, user-2 receives the message using, for example, a directed reception beam aimed at user-1. Responsive to the message, at 855, user-2 switches from receive mode to transmit mode, so that its beam is then configured to direct a transmission toward user-1, and then transmits an acknowledgement to user-1.

At 856, optionally, user-2 may then communicate with user-3 by determining the location of user-3, calculating an angle toward user-3, preparing a transmission beam aimed at user-3, and transmitting another message to user-3. Likewise, user-3 may have prepared a reception beam aimed at user-2 and may thereby receive the message from user-2.

An advantage of mobile, autonomous, robotic industrial devices communicating with each other, including specifying their locations and optionally their motions in messages, may be that the devices may thereby direct beamformed messages to each other, and thereby cooperate in avoiding collisions and other problems. Using such beamformed messaging, the devices may also collaborate in accomplishing their tasks more effectively than they could without the location-based directional communications. Another advantage may be that a supervisory entity, monitoring the communications as well as other measurements of activity, may detect incipient problems in time to avoid them, thereby keeping a steady rapid pace of operations.

5G, and especially 6G, have enormous potential for communications between mobile user devices and other entities, such as base stations, vehicles in traffic, roadside devices, industrial robots, and innumerable other applications for low-cost wireless communication. The systems and methods disclosed herein are intended to provide means for user devices in motion to cooperate by exchanging location information messages, thereby enabling beamformed transmission and reception toward each other, based on the location information. Further disclosed systems and methods may enable user devices to exchange speed and direction of travel information, from which other user devices may calculate subsequent locations of each participating user device. In addition, sidelink communications between user devices may benefit from similar location disclosures. These protocols may thereby provide readily applicable solutions to longstanding limitations of communications with mobile devices, enabling many wireless applications that would be unfeasible, absent the systems and methods disclosed herein.

The systems and methods may be fully implemented in any number of computing devices. Typically, instructions are laid out on computer readable media, generally non-transitory, and these instructions are sufficient to allow a processor in the computing device to implement the method of the invention. The computer readable medium may be a hard drive or solid state storage having instructions that, when run, or sooner, are loaded into random access memory. Inputs to the application, e.g., from the plurality of users or from any one user, may be by any number of appropriate computer input devices. For example, users may employ vehicular controls, as well as a keyboard, mouse, touchscreen, joystick, trackpad, other pointing device, or any other such computer input device to input data relevant to the calculations. Data may also be input by way of one or more sensors on the robot, an inserted memory chip, hard drive, flash drives, flash memory, optical media, magnetic media, or any other type of file-storing medium. The outputs may be delivered to a user by way of signals transmitted to robot steering and throttle controls, a video graphics card or integrated graphics chipset coupled to a display that maybe seen by a user. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., embedded systems and processors, personal computers, laptop computers, notebook computers, net book computers, handheld computers, personal digital assistants, mobile phones, smart phones, tablet computers, and also on devices specifically designed for these purpose. In one implementation, a user of a smart phone or Wi-Fi-connected device downloads a copy of the application to their device from a server using a wireless Internet connection. An appropriate authentication procedure and secure transaction process may provide for payment to be made to the seller. The application may download over the mobile connection, or over the Wi-Fi or other wireless network connection. The application may then be run by the user. Such a networked system may provide a suitable computing environment for an implementation in which a plurality of users provide separate inputs to the system and method.

It is to be understood that the foregoing description is not a definition of the invention but is a description of one or more preferred exemplary embodiments of the invention. The invention is not limited to the particular embodiments(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater, or different steps than that shown here. All such other embodiments, changes, and modifications are intended to come within the scope of the appended claims.

As used in this specification and claims, the terms "for example", "e.g.", "for instance", "such as", and "like" and the terms "comprising", "having", "including", and their other verb forms, when used in conjunction with a listing of one or more components or other items, are each to be construed as open-ended, meaning that the listing is not to be considered as excluding other additional components or items. Other terms are to be construed using their broadest reasonable meaning unless they are used in a context that requires a different interpretation.

The invention claimed is:

1. Non-transitory computer-readable media in a base station of a wireless network comprising instructions that, when implemented, cause the base station to perform a method comprising:
   determining a first location corresponding to the base station or to an antenna of the base station;
   receiving a first message, from a mobile user device, specifying a second location corresponding to the mobile user device;
   calculating, based at least in part on the first and second locations, a direction toward the mobile user device from the base station;
   preparing a downlink transmission beam aimed according to the direction; and transmitting, to the mobile user device, a second message according to the downlink transmission beam.

2. The media of claim 1, wherein the first message and the second message are transmitted according to 5G or 6G technology.

3. The media of claim 1, wherein the second message specifies the location of the base station.

4. The media of claim 1, wherein the preparing a downlink transmission beam comprises operating the antenna of the base station to emit a maximum power in a particular direction.

5. The media of claim 4, wherein the transmitting comprises aiming the particular direction toward the user device.

6. The media of claim 4, the method further comprising:
preparing an uplink reception beam aimed according to the direction; and
receiving, from the mobile user device, according to the uplink reception beam, a third message;
wherein the preparing the uplink reception beam comprises operating the antenna of the base station to receive a maximum sensitivity in the particular direction.

7. The media of claim 1, wherein the first message further specifies a speed of the user device and a direction of travel of the user device.

8. The media of claim 7, the method further comprising:
measuring a time interval after receiving the first message;
calculating, based at least in part on the speed of the user device and the direction of travel of the user device, an updated location of the user device;
redirecting the downlink transmission beam according to the updated location of the user device; and
transmitting a fourth message to the user device according to the redirected downlink transmission beam.

9. The media of claim 7, the method further comprising:
providing, in non-transitory computer-readable memory, a map comprising one or more roads proximate to the base station; and
determining, based at least in part on the second location, a particular road in the map.

10. The media of claim 9, the method further comprising:
measuring a time interval after receiving the first message;
calculating, based at least in part on the speed of the user device and the direction of travel of the user device and the particular road, an updated location of the user device;
redirecting the downlink transmission beam according to the updated location of the user device; and
transmitting a fifth message to the user device according to the redirected downlink transmission beam.

11. A method for a mobile user device to transmit a message to a base station, comprising:
determining, by the mobile user device, a location of the base station;
determining, by the mobile user device, a location of the mobile user device;
calculating, by the mobile user device, based at least in part on the location of the base station and the location of the mobile user device, an angle or direction toward the base station from the mobile user device;
preparing, by the mobile user device, an uplink transmission beam aimed according to the angle or direction; and
transmitting, by the mobile user device, according to the uplink transmission beam, the message.

12. The method of claim 11, wherein the message comprises an indication of the location of the mobile user device.

13. The method of claim 12, wherein the message further comprises an indication of the a speed of the mobile user device and an indication of a direction of travel of the mobile user device.

14. The method of claim 11, wherein the determining the location of the base station comprises receiving, from the base station, a system information message specifying the location of the base station.

15. The method of claim 11, wherein the determining the location of the base station comprises reading, from a tabulation of wireless network data, the location of the base station.

16. The method of claim 11, wherein the preparing the uplink transmission beam comprises operating an antenna of the mobile user device to emit unidirectional power aimed at the base station.

17. A first mobile user device configured to:
determine a first location of the first mobile user device;
transmit a first message, specifying the first location, to a second user device;
receive a second message, transmitted by the second mobile user device, specifying a second location of the second mobile user device;
calculate a direction from the first location toward the second location;
prepare a sidelink transmission beam according to the direction; and
then transmit a message to the second mobile user device according to the sidelink transmission beam.

18. The first mobile user device of claim 17, wherein:
the first message further specifies a first identification code of the first mobile user device; and
the second message further specifies a second identification code of the second mobile user device.

19. The first mobile user device of claim 18, wherein the first mobile user device is further configured to transmit a message specifying a speed of the first mobile user device and a direction of travel of the first mobile user device.

20. The first mobile user device of claim 17, further configured to:
prepare a sidelink reception beam according to the direction; and
receive a third message from the second mobile user device according to the sidelink reception beam;
wherein the sidelink reception beam comprises a maximum received sensitivity in a particular direction which is aimed toward the second mobile user device.

* * * * *